US007167940B2

(12) United States Patent
Nakamura et al.

(10) Patent No.: US 7,167,940 B2
(45) Date of Patent: Jan. 23, 2007

(54) DATA PROCESSING METHOD, DATA PROCESSING APPARATUS, COMMUNICATIONS DEVICE, COMMUNICATIONS METHOD, COMMUNICATIONS PROTOCOL AND PROGRAM

(75) Inventors: Atsushi Nakamura, Kanagawa (JP); Koji Fukunaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 10/253,510

(22) Filed: Sep. 25, 2002

(65) Prior Publication Data

US 2003/0065865 A1    Apr. 3, 2003

(30) Foreign Application Priority Data

Oct. 1, 2001    (JP)    ............................. 2001-305410

(51) Int. Cl.
*G06F 13/14*    (2006.01)
(52) U.S. Cl. ........................................ 710/305; 710/306
(58) Field of Classification Search ................ 710/100, 710/107, 305–306; 709/212; 370/252, 412
See application file for complete search history.

(56) References Cited

U.S. PATENT DOCUMENTS 6,078,415 A * 6/2000 Yamamoto ..................... 398/1
6,425,019 B1 * 7/2002 Tateyama et al. ............. 710/11
6,434,117 B1 * 8/2002 Momona ...................... 370/236
6,452,693 B1 * 9/2002 Isoda et al. ................. 358/1.16
6,647,016 B1 * 11/2003 Isoda et al. .................. 370/412
6,667,987 B1 * 12/2003 Kwon et al. ................. 370/437
6,701,371 B1 * 3/2004 Lee ............................. 709/231

* cited by examiner

*Primary Examiner*—Rehana Perveen
*Assistant Examiner*—Kim T. Huynh
(74) *Attorney, Agent, or Firm*—Fitzpatrick, Cella, Harper & Scinto

(57) ABSTRACT

To prevent a command from being unsmoothly issued when a communications channel (LUN) from a conventional initiator to a target enters communications disabled state for any reason there is provided, a data processing method for use between two nodes which are connected to a serial bus and perform communications by a plurality of logical communications units, in which, in the plurality of logical communications units, a first logical communications unit is used in data communications from an initiator to a target, a second logical communications unit is used in data communications from a target to an initiator, and a control command issued from the initiator to the target can be issued to and received by both logical communications units.

27 Claims, 28 Drawing Sheets

FIG. 7

CSR CORE REGISTER

| OFFSET (HEXADECIMAL) | REGISTER NAME | FUNCTION |
|---|---|---|
| 000 | STATE_CLEAR | STATE AND CONTROL INFORMATION |
| 004 | STATE_SET | INFORMATION INDICATING WRITE ENABLE OF STAGE_CLEAR |
| 008 | NODE_IDS | BUS ID + NODE ID |
| 00C | RESET_START | RESETTING BUS BY WRITE TO THIS AREA |
| 010 TO 014 | INDIRECT_ADDRESS, INDIRECT_DATA | REGISTER FOR ACCESS TO ROM OF 1K OR MORE |
| 018 TO 01C | SPRIT_TIMEOUT | VALUE OF TIMER FOR DETECTION OF TIMEOUT OF SPLIT TRANSACTION |
| 020 TO 02C | ARGUMENT, TEST_START, TEST_STATUS | DIAGNOSTIC REGISTER |
| 030 TO 04C | UNITS_BASE, UNITS_BOUND, MEMORY_BASE, MEMORY_BOUND | NO IMPLEMENTATION FOR IEEE1394 |
| 050 TO 054 | INTERRUPT_TARGET, INTERRUPT_MASK | INTERRUPT NOTIFICATION REGISTER |
| 058 TO 07C | CLOCK_VALUE, CLOCK_TICK_PERIOD, CLOCK_STOROBE_ARRIVED, CLOCK_INFO | NO IMPLEMENTATION FOR IEEE1394 |
| 080 TO 0FC | MESSAGE_REQUEST, MESSAGE_RESPONSE | MESSAGE NOTIFICATION REGISTER |
| 100 TO 17C | | RESERVATION |
| 180 TO 1FC | ERROR_LOG_BUFFER | RESERVATION FOR IEEE1394 |

FIG. 8

SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONOUS OPERATION |
| 208 | POWER_FAIL_IMMINENT | REGISTER FOR POWER SUPPLY |
| 20C | POWER_SOURCE | |
| 210 | BUSY_TIMEOUT | CONTROL OF RETRIAL OF TRANSACTION LAYER |
| 214 TO 218 | | RESERVATION |
| 21C | BUS_MANAGER_ID | NODE ID OF BUS MANAGER |
| 220 | BANDWIDTH_AVAILABLE | MANAGING BAND OF ISOCHRONOUS TRANSFER |
| 224 TO 228 | CHANNELS_AVAILABLE | MANAGING CHANNEL NUMBER OF ISOCHRONOUS TRANSFER |
| 22C | MAINT_CONTROL | DIAGNOSTIC REGISTER |
| 230 | MAINT_UTILITY | RESERVATION |
| 234 TO 3FC | | |

MINIMAL CONFIGURATION ROM

FIG. 11

SERIAL BUS DEVICE REGISTER

| OFFSET (HEXADECIMAL) | REGISTER NAME | FUNCTION |
|---|---|---|
| 800 TO FFC | | RESERVATION |
| 1000 TO 13FC | TOPOLOGY_MAP | CONFIGURATION INFORMATION ABOUT SERIAL BUS |
| 1400 TO 1FFC | | RESERVATION |
| 2000 TO 2FFC | SPEED_MAP | INFORMATION ABOUT TRANSFER SPEED OF SERIAL BUS |
| 3000 TO FFFC | | RESERVATION |

(SECTIONAL VIEW OF CABLE)

(EXCLUSIVE-OR SIGNAL OF DATA AND STROBE)

REQUEST FOR BUS USE RIGHT

ACCEPTING USE OF BUS

COMMAND BLOCK ORB

MANAGEMENT ORB

LINKED LIST OF COMMAND BLOCK ORB

WHEN DATA BUFFER IS DIRECTLY INDICATED

WHEN PAGETABLE IS PASSED THROUGH

STATUS BLOCK

OPERATION OF SBP-2 (LOGIN AND LOGIN RESPONSE)

OPERATION OF SBP-2 (FIRST OPERATION IN EXECUTING TASK)

OPERATION OF SBP-2 (OPERATION OF COMMAND BLOCK ORB)

FIG. 36

SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | COUNTER FOR SYNCHRONOUS OPERATION |
| 208 | POWER_FAIL_IMMINENT | COUNTER RELATING TO POWER SUPPLY |
| 20C | POWER_SOURCE | |
| 210 | BUSY_TIMEOUT | CONTROL OF RETRIAL OF TRANSACTION LAYER |
| 214 TO 218 | | RESERVATION |
| 21C | BUS_MANAGER_ID | NODE ID OF BUS MANAGER |
| 220 | BANDWIDTH_AVAILABLE | MANAGEMENT OF BAND OF ISOCHRONOUS TRANSFER |
| 224 TO 228 | CHANNELS_AVAILABLE | MANAGEMENT OF CHANNEL NUMBER OF ISOCHRONOUS TRANSFER |
| 22C | MAINT_CONTROL | DIAGNOSTIC REGISTER |
| 230 | MAINT_UTILITY | |
| 234 TO 23C | | RESERVATION |

FIG. 37
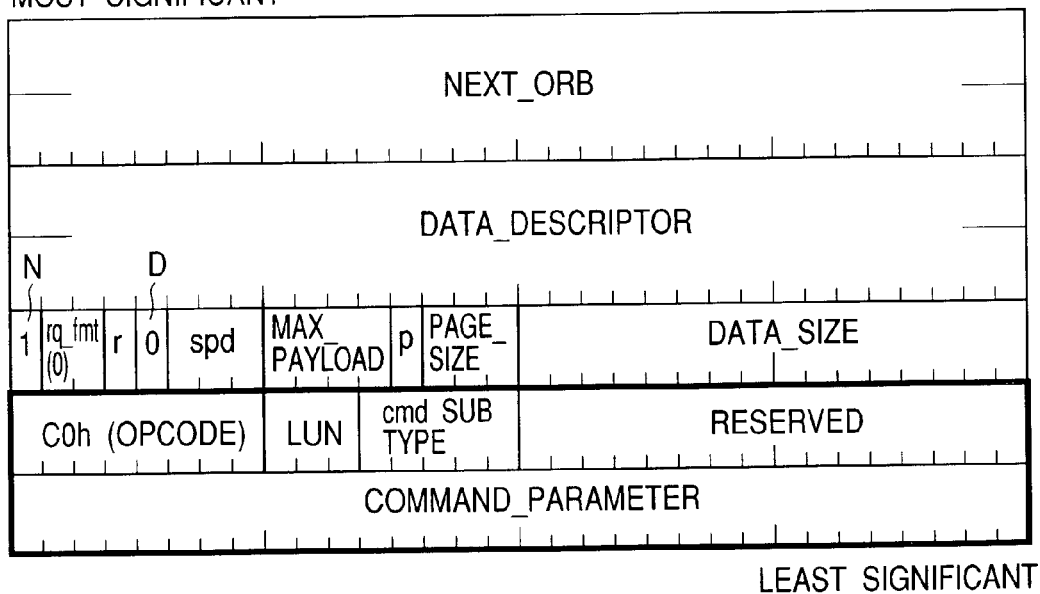
 : COMMAND SET DEPENDENT FIELD

FIG. 38

| ACCESS COMMAND OPCODE | D BIT | USE |
|---|---|---|
| WRITE | 0 | FOR ISSUANCE OF GENERAL-PURPOSE COMMAND FOR WRITE OF DATA TO TARGET IN LUN 0 |
| READ | 1 | FOR ISSUANCE OF COMMAND FOR OBTAINING DATA FROM TARGET IN LUN 1<br>FOR WRITE OF HOST OF RESPONSE DATA |
| READ DATA COUNT | 1 | FOR OBTAINING READ COMMAND COMPLETION STATUS INFORMATION IMMEDIATELY BEFORE ISSUING THIS COMMAND |
| LUN VERSION | 1 | FOR OBTAINING LUN INFORMATION IN ACCORDANCE WITH THIS INTERFACE |

| SUB-FUNCTION SUB CMD TYPE | USE |
|---|---|
| DATA | ISSUING COMMON DATA COMMAND |
| INIT | PRINTER SYSTEM INITIALIZATION COMMAND |

DATA PROCESSING METHOD, DATA PROCESSING APPARATUS, COMMUNICATIONS DEVICE, COMMUNICATIONS METHOD, COMMUNICATIONS PROTOCOL AND PROGRAM

BACKGROUND OF THE INVENTION

1. Field of the Invention

The present invention relates to a data processing method, a data processing apparatus, a printer, a communications protocol, a storage medium, etc. for performing a data communicating process.

2. Related Background Art

When communications are established through one-to-one connection between a host and a device in various interfaces such as Centronics, USB, IEEE 1394, etc., the communications are performed by setting a plurality of logical communications units in a session of a communications protocol, that is, a logical channel connection, to control various functions of devices between a host and a device.

These logical channels are flow-controlled (communications control) for each channel. Normally, when a plurality of logical channels are used, there can be a configuration in which two types of logical channels, that is, a channel from the host to the device and a channel from the device to the host according to a data transfer direction, are provided, a configuration in which a plurality of bidirectional logical channels are provided for each control function, etc.

However, when data cannot be transmitted/received through a logical channel for any reason, a control command itself for getting the transmission/reception back to normal cannot be transmitted to the logical channel. If the data transfer of a channel from the host to the device cannot be smoothly performed when a one-way data channel is provided for each data transfer direction, then it is obvious that command data cannot be transmitted from the host to the device through the channel. Furthermore, when flow control is not smoothly performed in a channel unit with a bidirectional logical channel provided for each control function, the command cannot be transmitted through the channel.

SUMMARY OF THE INVENTION

An object of the present invention is to solve each of the above mentioned problems.

In a data processing method used between two nodes which are connected to a serial bus and perform communications through a plurality of logical communications units, the data processing apparatus according to the present invention uses a first logical communications unit in data communications from an initiator to a target, and a second logical communications unit in data communications from the target to the initiator in the plurality of the logical communications units, wherein a control command issued from the initiator to the target can be transmitted from and received by both logical communications units.

The communications device according to the present invention performs communications through a first channel for use in a data transfer from a target to an initiator, and a second channel for use in a data transfer from the initiator to the target, and includes:

a detection unit for detecting an error when the first channel is used to issue a specified command; and an issue unit for issuing a specified command using the second channel when the detection unit detects an error.

BRIEF DESCRIPTION OF THE DRAWINGS

FIG. 7 shows the address and function of information stored in the CSR core register in the 1394 interface;

FIG. 8 shows address and function of information stored in a serial bus register in the 1394 interface;

FIG. 11 shows the address and function of the information stored in the serial bus device register in the 1394 interface;

FIG. 36 shows a core CSR register of a printer according to an embodiment of the present invention;

FIG. 37 shows a format of a command ORB defined by a printer control communications command protocol for use between a printer and a host according to an embodiment of the present invention; and FIG. 38 shows a command defined by the printer control communications command protocol for use between the printer and the host according to an embodiment of the present invention.

DESCRIPTION OF THE PREFERRED EMBODIMENTS

Figure 1:
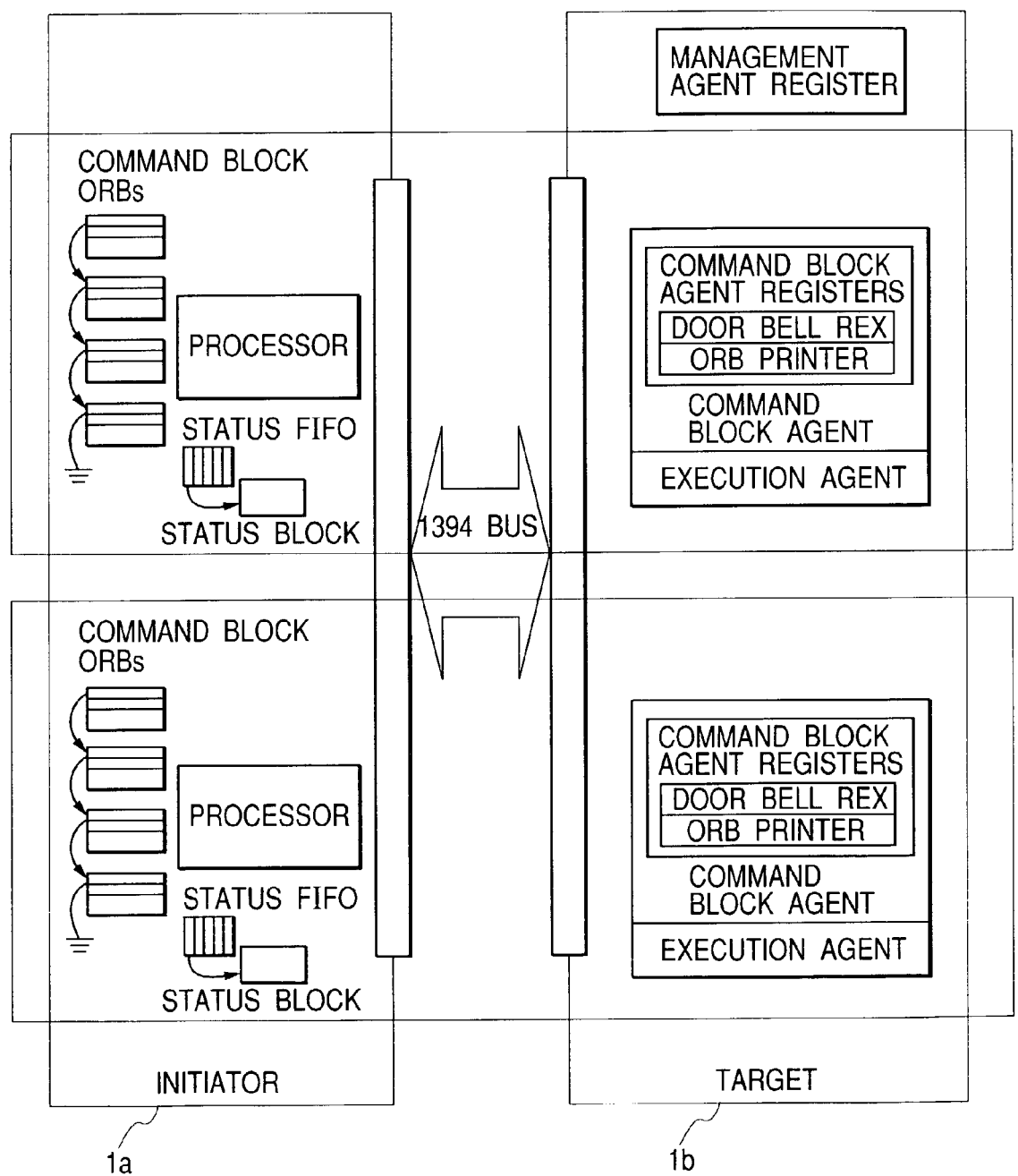
FIG. 1 shows a configuration of the system according to an embodiment of the present invention.

FIG. 1 is a best view showing the present invention, and shows a host computer (hereinafter referred to as a host) A and a printer B connected through IEEE 1394.

The communications between the computer A (initiator) and the printer B (target) are performed by using an SBP (serial bus protocol)-2 protocol, which is a typical data transfer protocol used in the 1394 interface, and a logical channel logical communications unit LUN 0 for the data transfer from a host to a printer, and a logical channel logical communications unit LUN 1 for the data transfer from a printer to a host are predetermined. The SBP-2 will be outlined later.

<Outline of the Technology of IEEE 1394>

Described below briefly will be the technology of the IEEE 1394–1995 Standard applied to the digital interface according to an embodiment of the present invention. The IEEE 1394–1995 Standard (hereinafter referred to as IEEE 1394 Standard) is described in detail in 'IEEE Standard for a High Performance Serial Bus' published by IEEE (The Institute of Electrical and Electronics Engineers, Inc.) on Aug. 30, 1996.

(1) Outline

Figure 2:
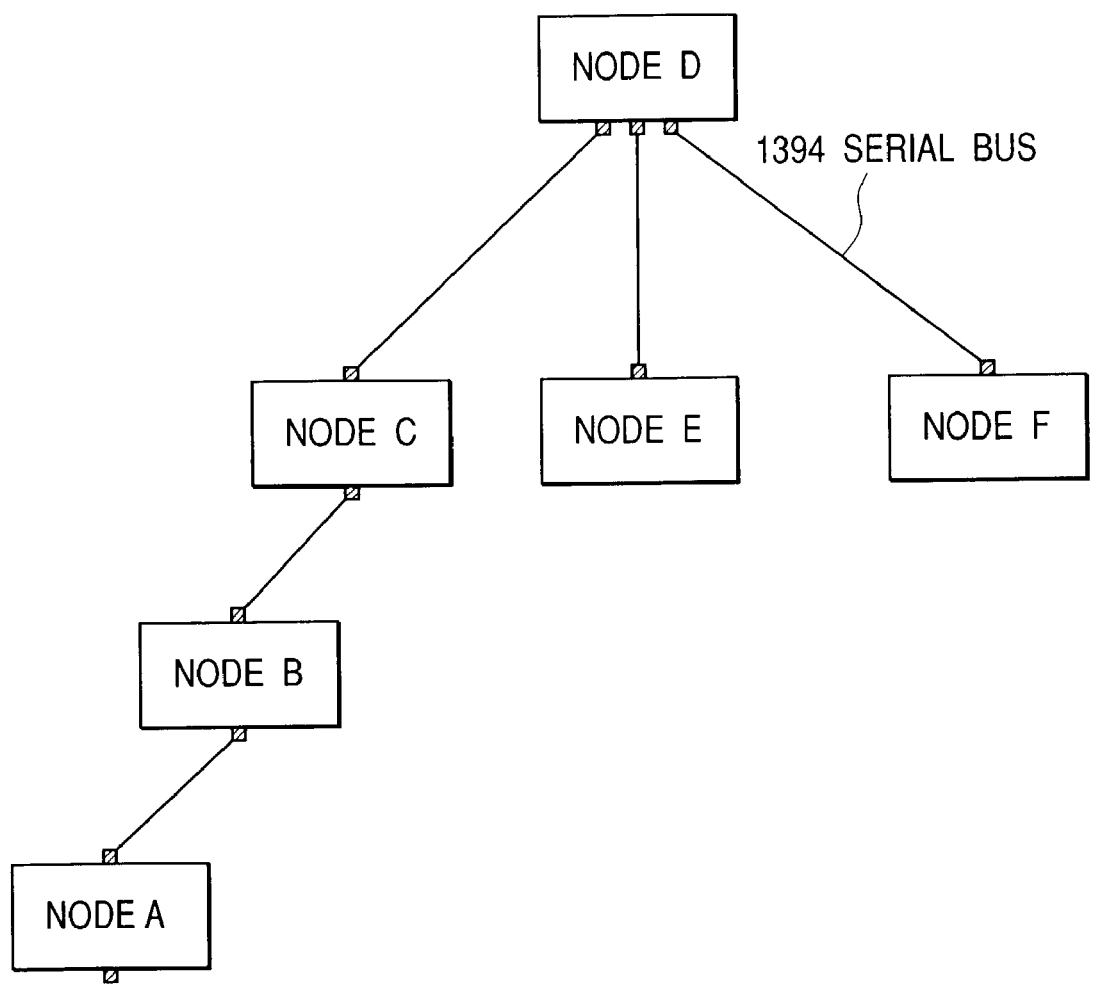
FIG. 2 shows a configuration of the network of a 1394 serial bus.

FIG. 2 shows an example of a communications system (hereinafter referred to as a 1394 network) configured by a node provided with a digital interface (hereinafter referred to as a 1394 interface) in accordance with the IEEE 1394 Standard. The 1394 network forms a bus type network capable of communicating serial data.

In FIG. 2, each of the nodes A to F is connected through a communications cable in accordance with the IEEE 1394 Standard. These nodes A to H are electronic equipment such as a PC (personal computer), a digital VTR (video tape recorder), a DVD (digital videodisc) player, a digital camera, a hard disk, a monitor, etc.

The connection system of the 1394 network corresponds to a daisy chain system and a node branch system, and can realize a highly flexible connection.

In the 1394 network, a bus reset is automatically performed when, for example, existing equipment is deleted, new equipment is added, the power source of existing equipment is turned ON/OFF. By performing the bus reset, the 1394 network can automatically recognize a new connection configuration and assign ID information to each piece of equipment. Using the function, the 1394 network can constantly recognize the connection configuration of the network.

Additionally, the 1394 network has the function of relaying data transferred from other equipment. Thereby, all equipment can grasp operating states of the bus.

Additionally, the 1394 network has the function referred to as Plug & Play through which the connection equipment can be automatically recognized only by a connecting operation without turning off the power of all equipment.

The 1394 network corresponds to the data transfer speed of 100/200/400 Mbps. Equipment having a higher data transfer speed can support sequentially having a lower data transfer speed. Therefore, pieces of equipment having different data transfer speeds can be connected to each other.

Furthermore, the 1394 network corresponds to two different data transfer systems (that is, an asynchronous transfer mode and an isochronous transfer mode).

The asynchronous transfer mode is effective when data requested to be asynchronously transferred as necessary (that is, a control signal, a file data, etc.) is to be transferred. The isochronous transfer mode is effective when a predetermined amount of data requested to be continuously transferred at a constant data rate (that is, video data, audio data, etc.) is to be transferred.

The asynchronous transfer mode and the isochronous transfer mode can coexist in each communications cycle (one communications cycle is normally 125 μS). Each transfer mode is executed after transferring a cycle start packet (hereinafter referred to as a CSP) indicating the start of a cycle.

In each communications cycle period, the isochronous transfer mode is set higher in priority than the asynchronous transfer mode. Additionally, the transfer band of the isochronous transfer mode is guaranteed in each communications cycle.

(2) Architecture

The components of the 1394 interface will be described below by referring to FIG. 3.

The 1394 interface is formed by a plurality of functional layers (hierarchy). In FIG. 3, the 1394 interface is connected to a 1394 interface of another node through a communications cable 301 in accordance with the IEEE 1394 Standard. The 1394 interface has one or more communications ports 302, and the communications port 302 is connected to a physical layer 303 contained in a hardware unit.

Figure 3:
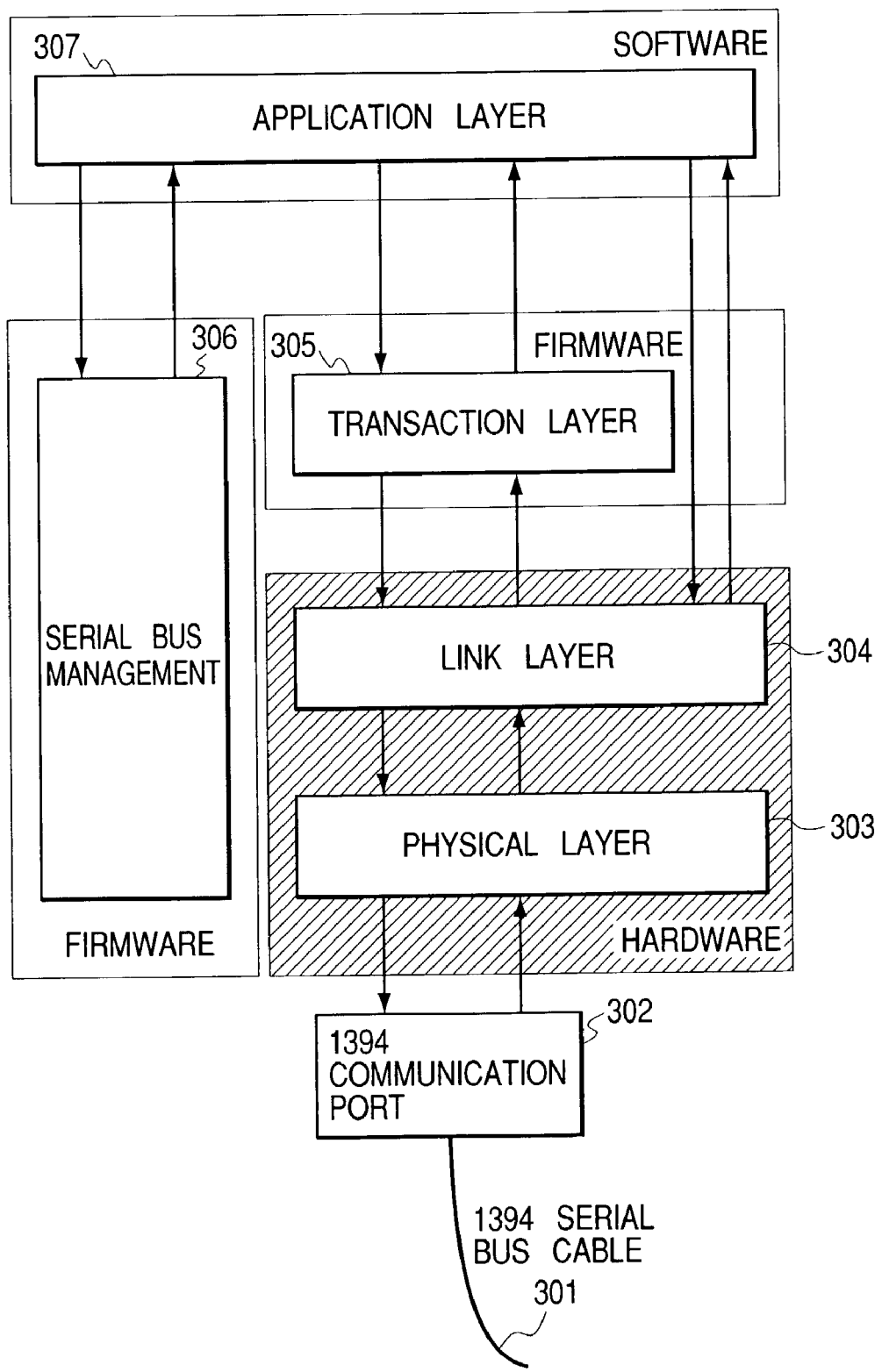
FIG. 3 shows components of the 1394 serial bus according to the present invention.

In FIG. 3, the hardware unit is formed by the physical layer 303 and a link layer 304. The physical layer 303 provides a physical and electrical interface with another node, performs a process of, and associated with, detecting a bus reset, codes/decodes an input/output signal, arbitrates a bus use right, etc. The link layer 304 generates and transmits/receives a communications packet, controls a cycle timer, etc.

In FIG. 3, a firmware unit includes a transaction layer 305 and a serial bus management 306. The transaction layer 305 manages the asynchronous transfer mode, and provides various transactions (read, write, and lock). The serial bus management 306 provides the functions of controlling its node, managing the connection state of its node, managing the ID information about its node, and managing the resources of a serial bus network based on the CSR architecture described later.

As described above, the hardware unit and the firmware unit practically form the 1394 interface, and the basic configuration is regulated by the IEEE 1394 Standard.

An application layer 307 contained in a software unit depends on the used application software, and controls the communications of data in a network. For example, moving picture data of digital VTR is regulated by a communications protocol such as AV/C protocol, etc.

(2-1) Link Layer 304

Figure 4:
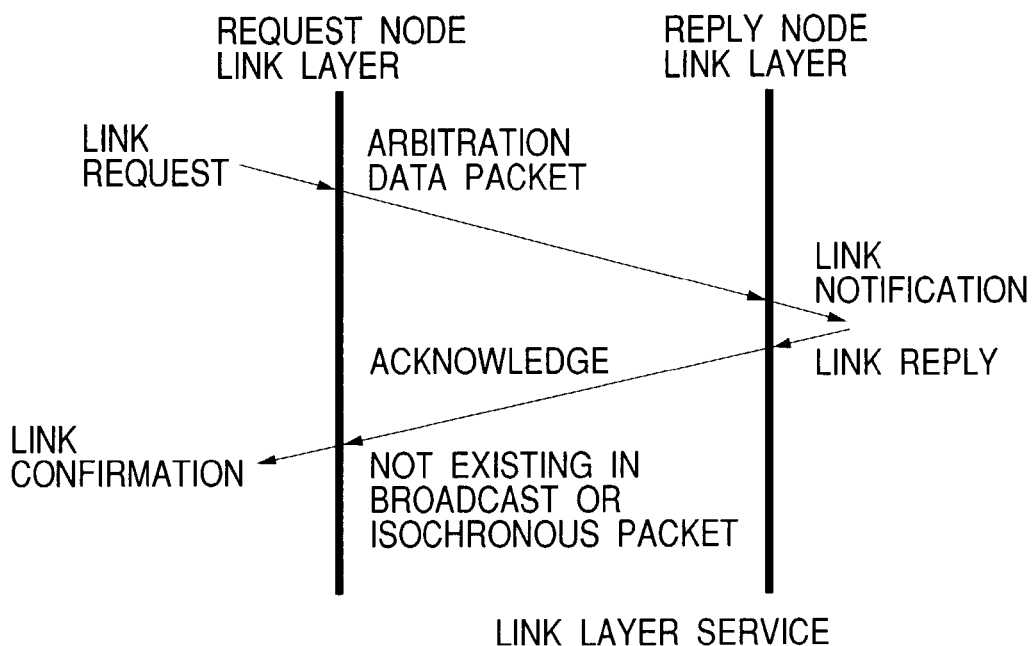
FIG. 4 shows a service capable of providing a link layer of the 1394 serial bus according to the present invention.

FIG. 4 shows a service to be provided by the link layer 304. In FIG. 4, the link layer 304 provides the following four services. That is, <1> a link request (LK_DATA.request) requesting a response node to transfer a predetermined packet, <2> a link notification (LK_DATA.indication) notifying a response node of reception of a predetermined packet, <3> a link response (LK_DATA.response) indicating reception of an acknowledge from a request node, and <4> link confirmation (LK_DATA.confirmation) confirming an acknowledge from a request node. The link response (LK_DATA.response) does not exist in broadcast communications and isochronous packet transfer.

The link layer 304 realizes the above mentioned two type of transfer systems, that is, the asynchronous transfer mode and the isochronous transfer mode, based on the above mentioned services.

(2-2) Transaction Layer 305

Figure 5:
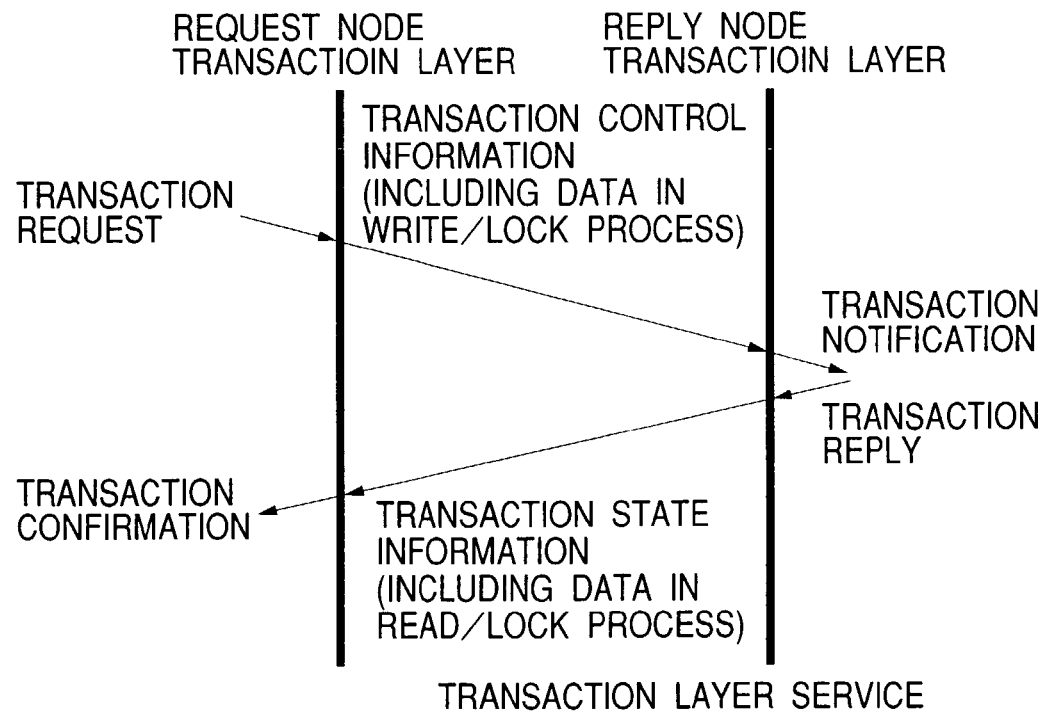
FIG. 5 shows a service capable of providing a transaction layer of the 1394 serial bus according to the present invention.

FIG. 5 shows a service which can be offered by the transaction layer 305. In FIG. 5, the transaction layer 305 provides the following four services. That is, <1> a transaction request (TR_DATA.request) requesting a response node for a predetermined transaction, <2> a transaction notification (TR_DATA.indication) notifying a response node of reception of a predetermined transaction request, <3> a transaction response (TR_DATA.response) indicating reception of status information (including data for write and lock) from a response node, and <4> transaction confirmation (TR_DATA.confirmation) for confirming status information from a request node.

The transaction layer 305 manages the asynchronous transfer based on the above mentioned services, and realizes the following three types of transactions, that is, <1> read transaction, <2> write transaction, <3> lock transaction.

<1> In the read transaction, the request node reads information stored at a specified address of response node.

<2> In the write transaction, the request node writes predetermined information at a specified address of the response node.

<3> In the lock transaction, the request node transfers reference data and updated data to the response node, compares the information at the specified address of the response node with the reference data, and updates the information at the specified address into the updated data depending on the comparison result.

(2-3) Serial Bus Management 306

The serial bus management 306 practically provides the following three functions. That is, <1> node control, <2> isochronous resources manager (hereinafter referred to as IRM), and <3> bus manager.

<1> In the node control, each of the above mentioned layers is managed, and the function of managing the asynchronous transfer between nodes is provided.

<2> The IRM provides the function of managing the isochronous transfer between nodes. Practically, the information required in assigning a transfer band width and a channel number is managed, and the information is provided for other nodes.

The IRM solely exists in a local bus, and is dynamically selected from among other prospects (nodes having the functions of the IRM) for each bus reset. The IRM can also provide a part of the functions (management of a connection configuration, management of a power source, management of speed information, etc.) provided by a bus manager as will be described later.

<3> A bus manager has the functions of the IRM, and provides the function of managing a bus at a level higher than the IRM. Practically, higher level power source management (managing information for each node as to whether or not a power can be supplied through a communications cable, whether or not power is to be supplied, etc.), higher level speed information management (managing maximum transfer speed between nodes), higher level connection configuration management (generating a topology map), the optimization of a bus according to the above mentioned management information, etc. are performed, and the obtained information is provided for other nodes.

Furthermore, the bus manager can provide an application with a service for controlling a serial bus network. The service can be a serial bus control request (SB_CONTROL.request), serial bus event control confirmation (SB_CONTROL.confirmation), serial bus event notification (SB_CONTROL.indication), etc.

SB_CONTROL.request is a service of an application requesting a bus reset. SB_CONTROL.confirmation is a service of confirming SB_CONTROL.request for the application. SB_CONTROL.indication is a service of notifying the application of an event occurring asynchronously.

(3) Addressing

Figure 6:
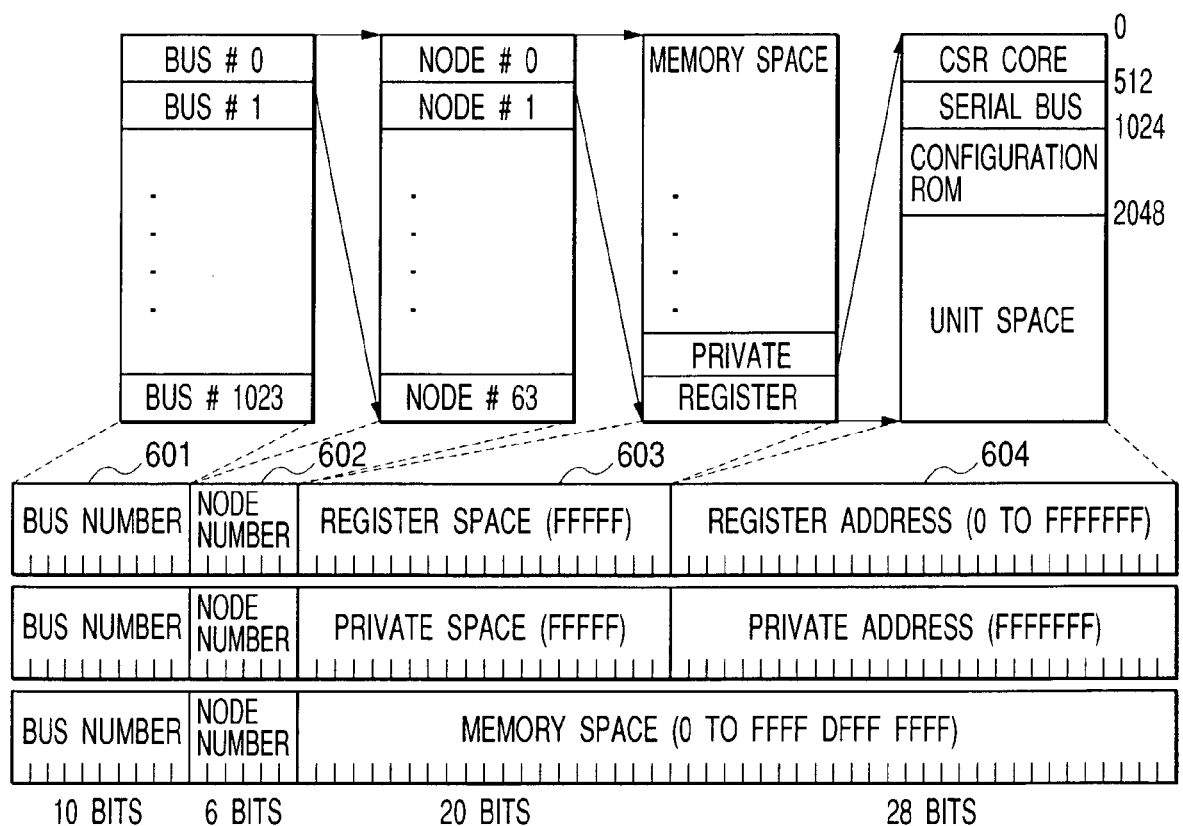
FIG. 6 is an explanatory view of an address space in the 1394 interface.

FIG. 6 shows an address space in the 1394 interface. The 1394 interface prescribes an address space of a 64-bit width according to the CSR (command and status register) architecture in accordance with the ISO/IEC 13213:1994.

In FIG. 6, the first 10-bit field 601 is used for an ID number specifying a predetermined bus, and the next 6-bit field 602 is used for an ID number specifying a predetermined equipment (node). The high order 16 bits are referred to as a node ID, and each node identifies another node by the node ID. Each node can communicate with a partner identified by the node ID.

The remaining 48-bit field specifies an address space (256 M byte structure) of each node. Among them, a 20-bit field 603 specifies a plurality of areas forming an address space.

In the field 603, the '0 to 0xFFFFD' portion is referred to as a memory space. The portion of '0xFFFFE' is referred to as a private space which can be freely used in each node. The portion of '0xFFFFE' is referred to as a register space, and stores common information between nodes connected through a bus. Each node can manage the communications between nodes using the information about the register space.

The last 28-bit field 604 specifies an address storing common or unique information in each node.

For example, in the register space, the first 512 bytes are used for a core (CSR core) register of a CSR architecture. The address and function of the information stored in the CSR core register are shown in FIG. 7. The offset in FIG. 7 is a relative position from '0xFFFFF0000000'.

The next 512 bytes are used as a register for a serial bus. FIG. 8 shows the address and the function of the information stored in the serial bus register. The offset shown in FIG. 8 is a relative position from '0xFFFFF0000200'.

The next 1024 bytes are used for configuration ROM.

Figure 9:
FIG. 9 shows the Configuration ROM in the smallest format in the 1394 interface.

The configuration ROM has the smallest format and the common format, and is arranged from '0xFFFFF0000400'. FIG. 9 shows the configuration ROM in the smallest format. In FIG. 9, the vendor ID is a 24-bit value uniquely assigned to each vendor by the IEEE.

Figure 10:
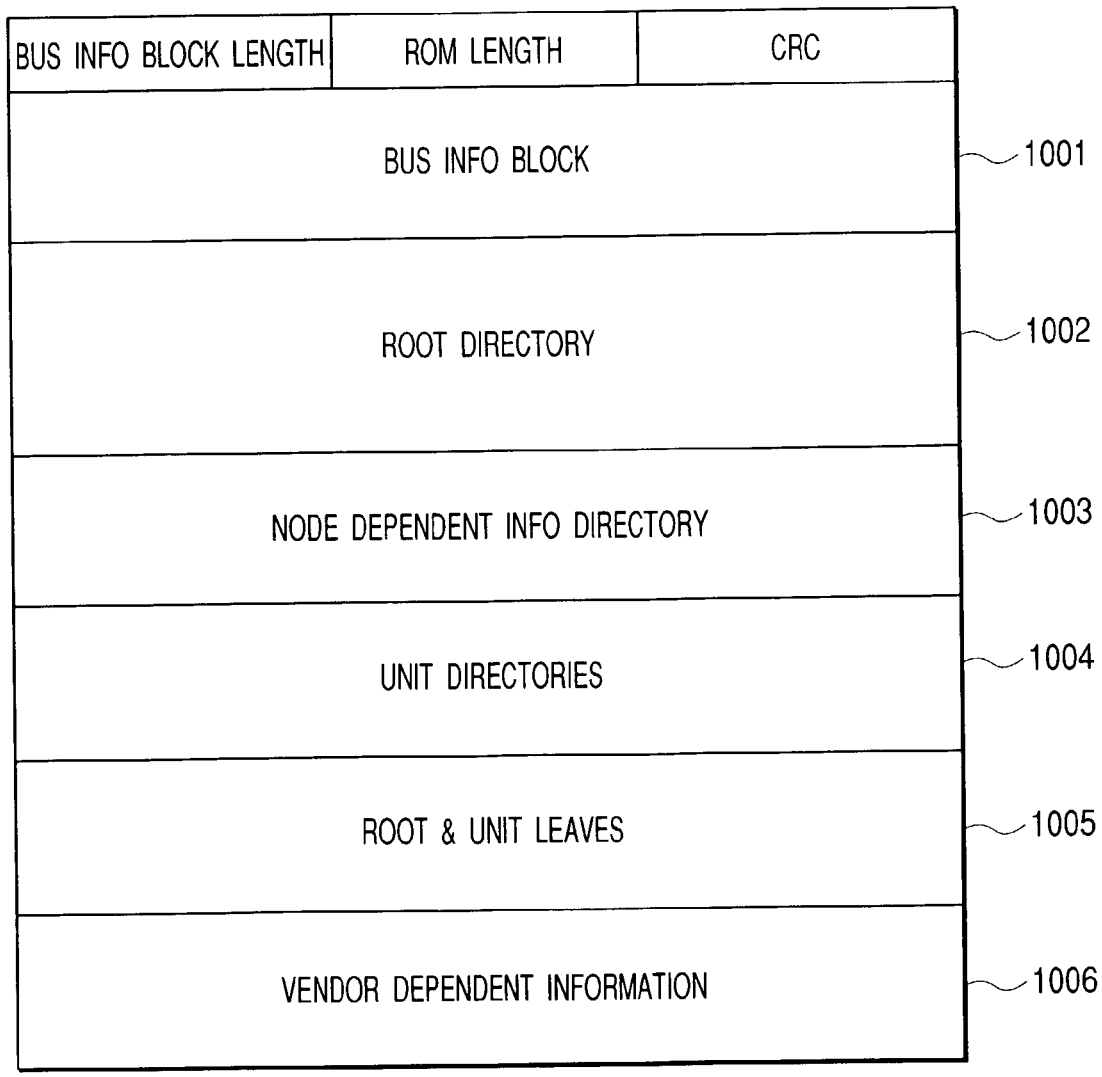
FIG. 10 shows a Configuration ROM of a common format in the 1394 interface.

FIG. 10 shows a configuration ROM in the common format. In FIG. 10, the above mentioned vendor ID is stored in a root directory 1002. A bus info block 1001 and a root leaf 1005 can hold a node unique ID as unique ID information for identification of each node.

A node unique ID refers to a unique ID for designation of one node regardless of manufacturer and model. The node unique ID is formed by 64 bits with high order 24 bits indicating the above mentioned vendor ID, and low order 48 bits indicating the information which can be freely set by a manufacturer of each node (for example, a production number, etc. of a node). The node unique ID is used when a specified node is recognized by, for example, checking it before and after a bus reset.

In FIG. 10, the root directory 1002 can hold information about a basic function of a node. Detailed information about the function is stored in a subdirectory (unit directories 1004) at an offset according to the root directory 1002. The unit directories 1004 stores, for example, the information about a software unit supported by a node. Practically, the information about a data transfer protocol for data communications between nodes, a command set for definition of a predetermined communications procedure, etc. are held.

In FIG. 10, a node dependent info directory 1003 can hold unique information about a device. The node dependent info directory 1003 is offset according to the root directory 1002.

Furthermore, in FIG. 10, a vendor dependent information 1006 can hold unique information about a vendor which produces or sells a node.

The remaining area is referred to as a unit space, and specifies an address storing unique information about each node, for example, identification information (company name, model name, etc.), a use condition, etc. of each equipment. FIG. 11 shows the address and function of information stored in a serial bus device register in a unit space. The offset in FIG. 11 is a relative position from '0xFFFFF0000800'.

Normally, when the design of a different bus system is to be simplified, each node is to use only the first 2048 bytes in the register space. That is, it is desired to configure it by a total of 4096 bytes of a CSR core register, a serial bus register, configuration ROM, the first 2048 bytes of a unit space.

(4) Configuration of Communications Cable

Figure 12:
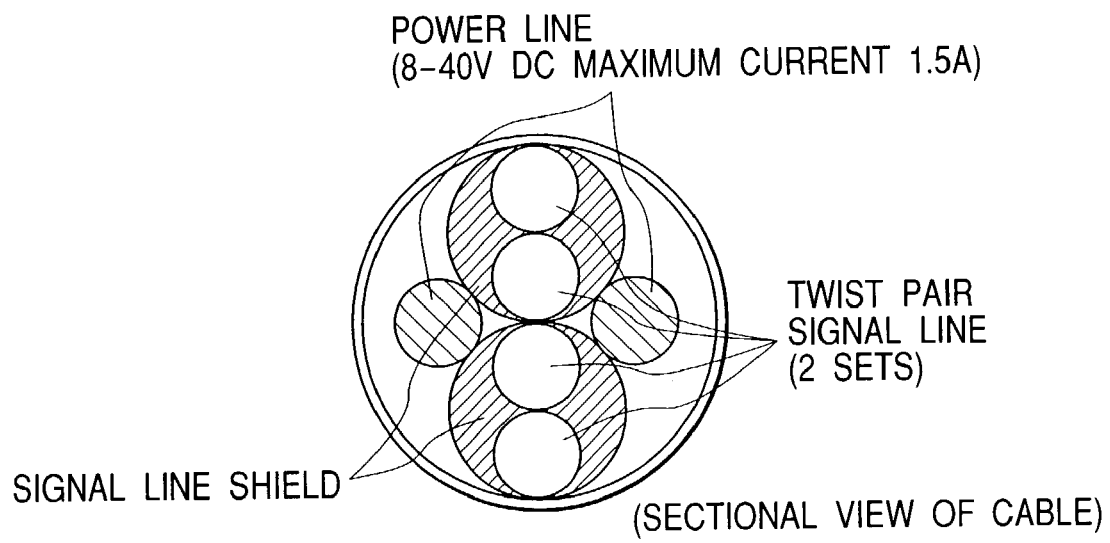
FIG. 12 is a sectional view of a communications cable in accordance with the IEEE 1394 standard.

FIG. 12 is a sectional view of a communications cable in accordance with the IEEE 1394 Standard.

The communications cable is configured by a two sets of twist pair signal lines and a power line. By providing a power line, the 1394 interface can provide electric power for equipment whose main power has been turned OFF, equipment whose power has been lowered by a failure, etc. It is prescribed that the voltage of power in the power line is 8 to 40 V, and the current is the maximum current of DC 1.5 A.

Figure 13:
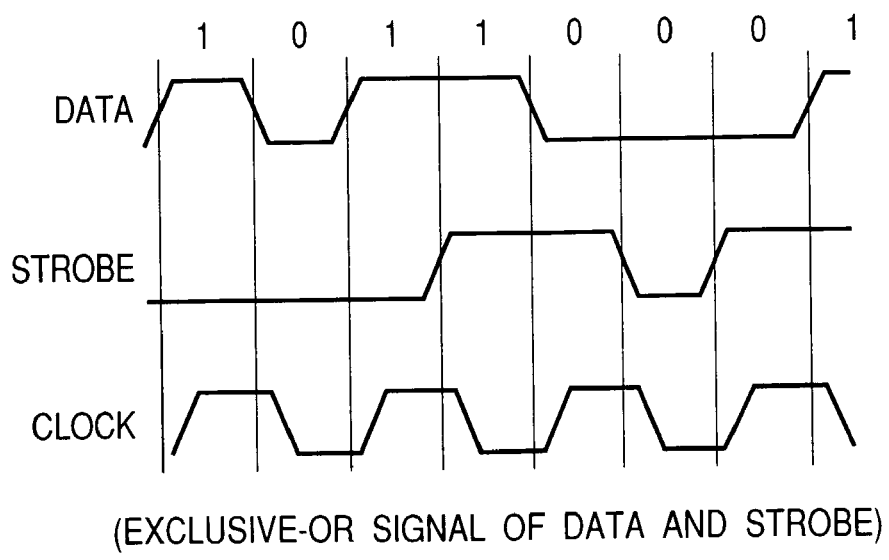
FIG. 13 is an explanatory view of a DS-Link coding system.

An information signal coded in the DS-Link (data/strobe link) coding system is transmitted to the two sets of twist pair signal lines. FIG. 13 shows the DS-Link coding system.

The DS-Link coding system can be applied to high-speed serial data communications, and the configuration requires two sets of twisted pair lines. A set of twisted pair lines transmits a data line, and another set of twisted pair lines transmits a strobe signal. The receiver can regenerate a clock by obtaining an exclusive-OR between a data signal and a strobe signal received through the two sets of signal lines.

In the DS-Link coding system, the 1394 interface has, for example, the following merits, that is: <1> higher transfer efficiency than other coding systems; <2> requiring no PLL circuits, thereby reducing a circuit scale of a controller LSI; and <3> transmitting no information about an idle state, thereby easily setting a sleep state of a transceiver circuit and reducing power consumption.

(5) Bus Reset

The 1394 interface of each node automatically detects a change in the connection configuration of a network. In this case, the 1394 network performs a process referred to as a bus reset in the following procedure. A change in the connection configuration can be detected by a change in a bias voltage in the communications port provided for each node.

A node in which a change in the connection configuration of a network (for example, the increase/decrease of the number of nodes by inserting/removing a node, turning ON/OFF of power for a node, etc.) is detected, or a node requiring the recognition of a new connection configuration transmits a bus reset signal on a bus through the 1394 interface.

The 1394 interface of a node which has received a bus reset signal transmits the occurrence of the bus reset to its link layer 304, and transfers the bus reset signal to another node. The node which has received the bus reset signal clears the connection configuration of the network which has been recognized, and the node ID assigned to each equipment. After all nodes have finally detected the bus reset signal, each node automatically performs an initializing process (that is, recognizing a new connection configuration and assigning a new node ID) accompanying the bus reset.

The bus reset can also be activated by the control of the host side for issuing an instruction directly to the physical layer 303 by the application layer 307 in addition to the activation by a change of the connection configuration as described above.

When the bus reset is activated, the data transfer is interrupted, and then resumed in a new network after completing the initializing process accompanying the bus reset.

(6) Sequence After Activating a Bus Reset

After activating the bus reset, the 1394 interface of each node automatically recognizes a new connection configuration and assigns a new node ID. The basic sequence from the start of the bus reset to the node ID assigning process by referring to FIGS. 14 to 16.

Figure 14:
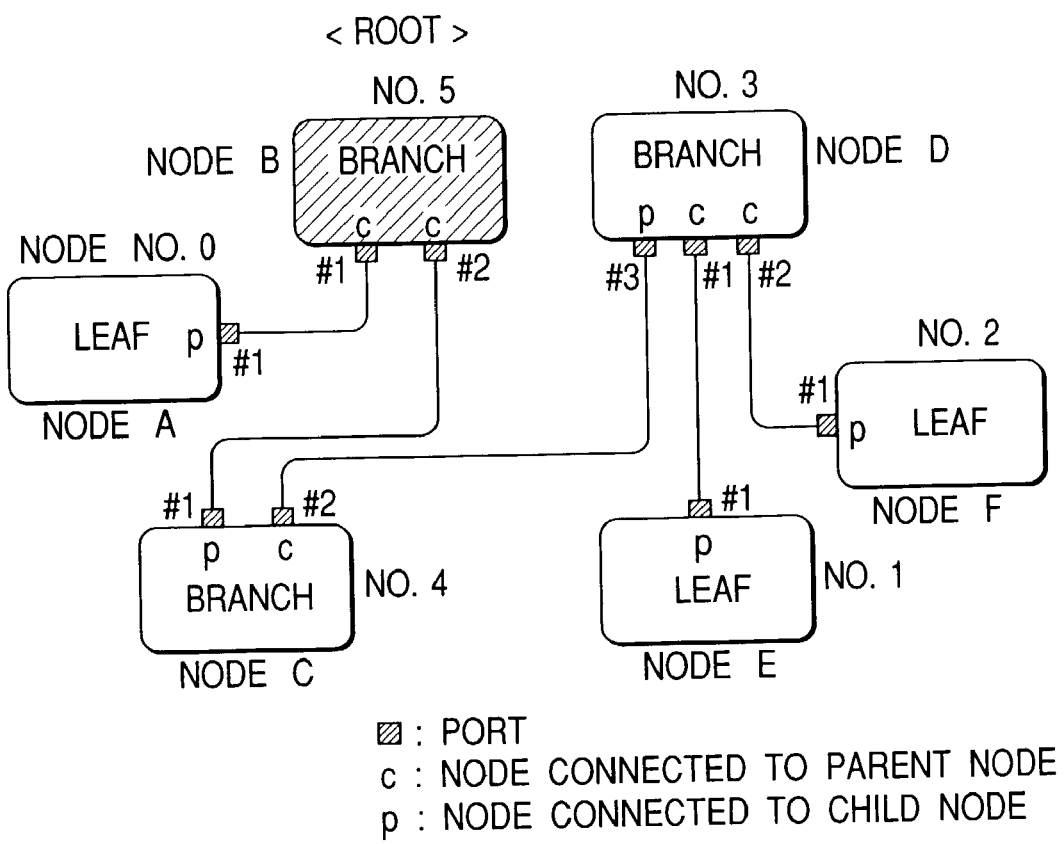
FIG. 14 shows a basic sequence from a start of a bus reset to a process of assigning a node ID.

FIG. 14 shows the state after the activation of a bus reset in the 1394 network shown in FIG. 2.

In FIG. 14, a node A has a communications port, a node B has two communications ports, a node C has two communications ports, a node D has three communications ports, a node E has a communications port, and a node F has a communications port. The communications port of each node is assigned a port number for identification of each port.

The process from the start of the bus reset to assigning a node ID as shown in FIG. 14 will be described below by referring to the flowchart shown in FIG. 15.

Figure 15:
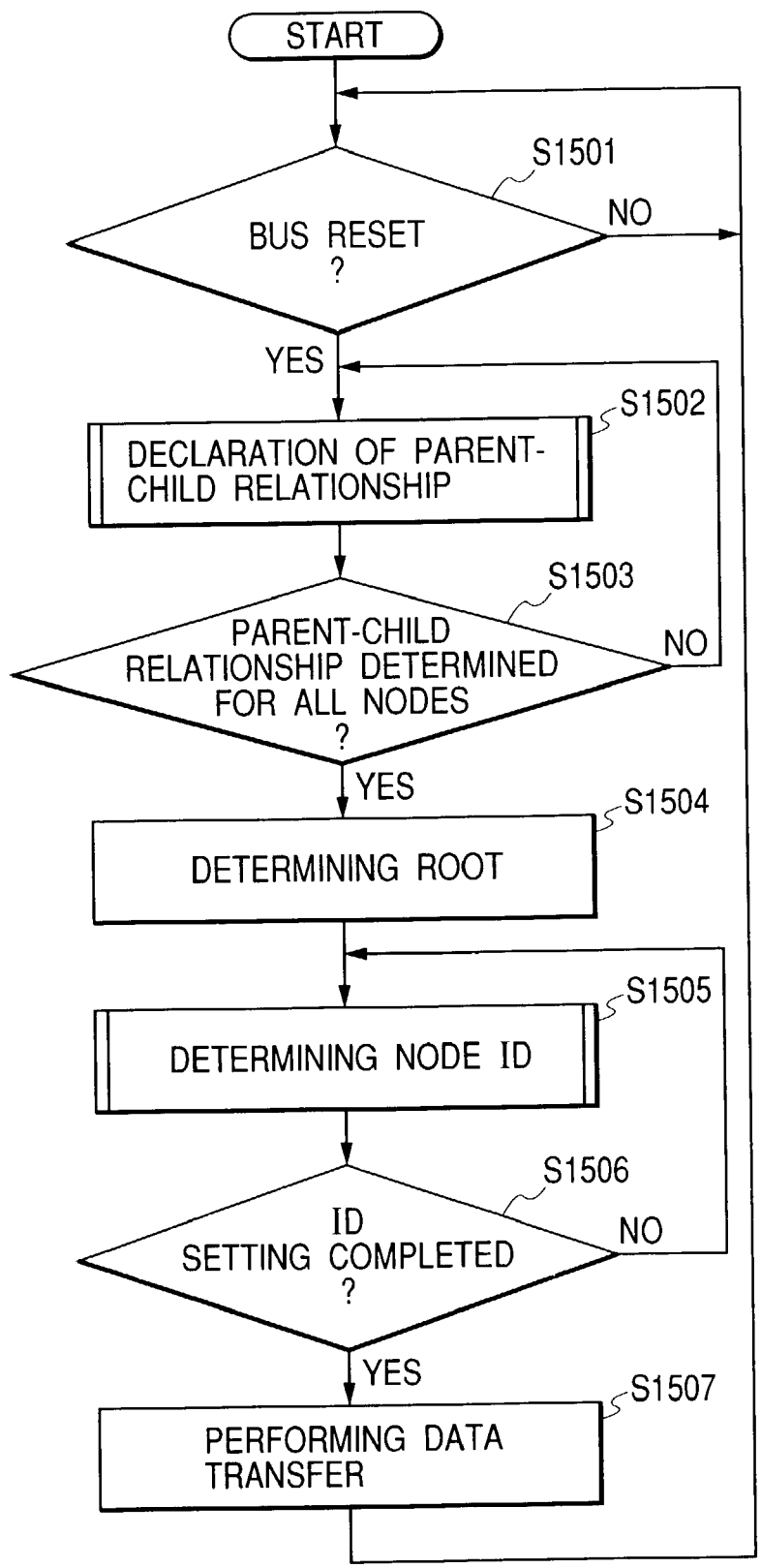
FIG. 15 shows a basic sequence from the start of a bus reset to the process of assigning a node ID.

In FIG. 15, each of the nodes A to F forming the 1394 network constantly monitors whether or not the bus reset has occurred (step S1501). When a bus reset signal is output from the node which detects a change in a connection configuration, each node performs the following process.

After the occurrence of a bus reset signal, each of the nodes declares a set membership among the respective communications ports of the nodes (step S1502).

Each node repeatedly performs the process in step S1502 until the set memberships in all nodes are determined (step S1503).

After the set memberships in all nodes are determined, the 1394 network determines a node which arbitrates the network, that is, a root (step S1504).

After the root has been determined, the 1394 interface of each node performs an operation of automatically setting its own node ID (step S1505).

Until the node IDs are set for all nodes, each node performs the process in step S1505 in the predetermined procedure (step S1506).

After the node IDs are finally set for all nodes, each node performs the isochronous transfer or the asynchronous transfer (step S1507).

When the process in step S1507 is performed, the 1394 interface of each node monitors the occurrence of a bus reset again. When a bus reset occurs, the processes in and after step S1501 are performed again.

In the above mentioned procedure, the 1394 interface of each node can automatically recognize a new connection configuration and assign a new node ID each time when the bus reset is activated.

(7) Determining Set Membership

Then, by referring to FIG. 16, the process in step S1502 shown in FIG. 15 (that is, the process of recognizing the set membership between nodes) will be described in detail.

Figure 16:
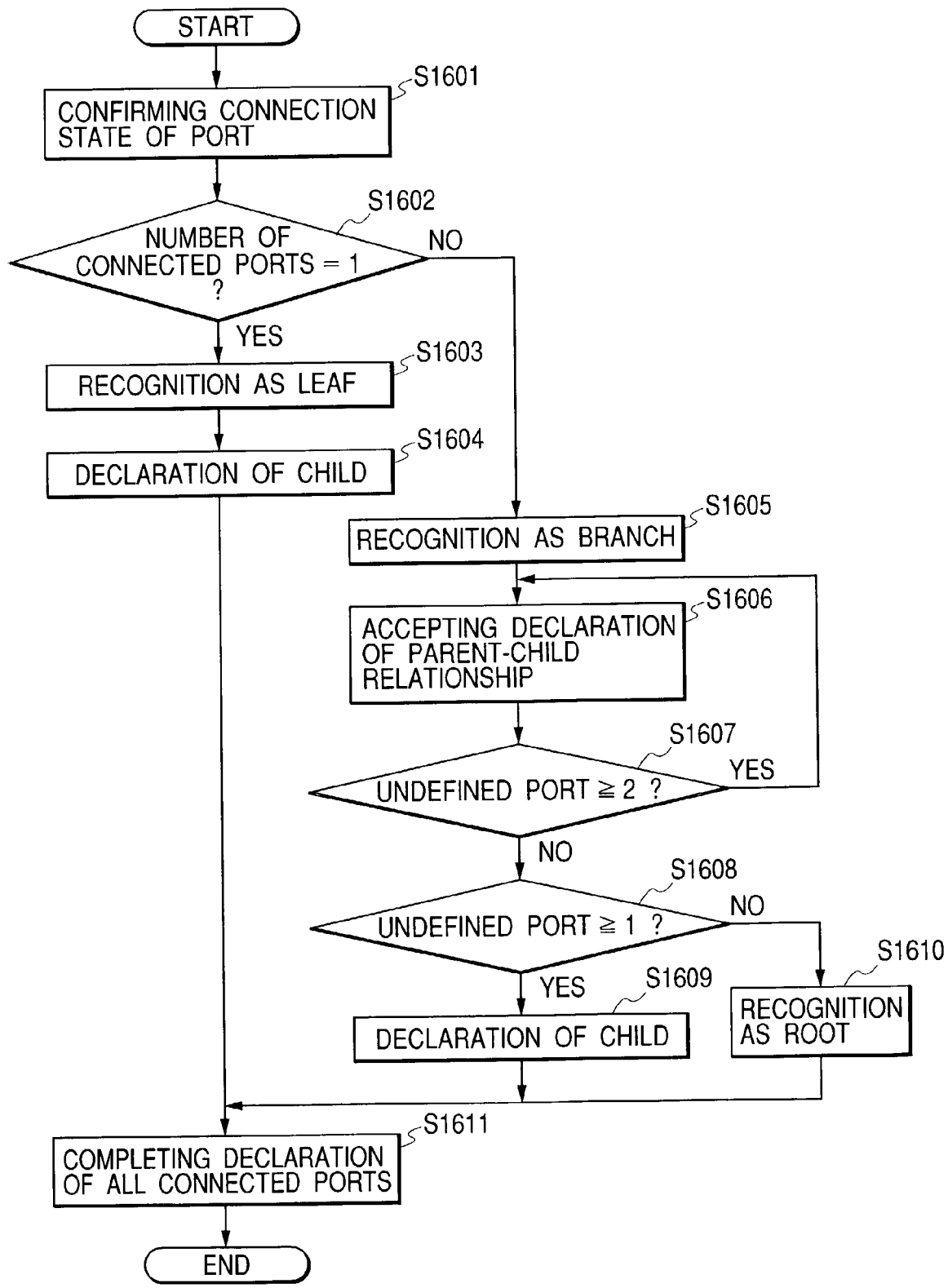
FIG. 16 shows a basic sequence from the start of a bus reset to the process of assigning a node ID.

In FIG. 16, after the occurrence of a bus reset, each of the nodes A to F in the 1394 network confirms the connection status (connected or unconnected) of the communications port provided in each node (step S1601).

After confirming the connection status of the communications port, each node counts the number of communications ports connected to another node (hereinafter referred to as a connection port) (step S1602).

If the number of connection ports is 1 as a result of the process in step S1602, then the node recognizes it as a leaf (step S1603). A leaf refers to a node connected only to one node.

The node which is a leaf declares that it is a child to a node connected to the connection port (step S1604). At this time, the leaf recognizes that the connection port is a 'parent port (a communications port connected to the parent node)'.

The declaration of a set membership is first made between a leaf and a branch which are ends in a network, and then sequentially made between branches. The set memberships between nodes are sequentially determined from a communications port which is the first to declare it. Between nodes, a communications port which declares a child is recognized as a 'parent port', and a communications port receiving the declaration is recognized as a 'child port (a communications port connected to a child node)'. For example, in FIG. 14, after the nodes A, E, and F recognize that they are leaves, they declare a set membership. Thus, a child-parent relationship is determined between the nodes A and B, a child-parent relationship is determined between the nodes E and D, a child-parent relationship is determined between the nodes F and D.

If the number of connection ports is two or more as a result of the process in step S1602, then the node recognizes itself as a 'branch' (step S1605). A branch refers to a node connected to two or more nodes.

A node which is a branch receives a declaration of a set membership from a node of each connection port (step S1606). The connection port which receives the declaration is recognized as a 'child port'.

After recognizing one connection port as a 'child port', the branch detects whether or not there are two or more connection ports for which set memberships have not been determined (that is, undefined ports) (step S1607). As a result, if there are two or more undefined ports, the branch performs the operation in step S1606 again.

If there is only one undefined port as a result of step S1607, the branch recognizes that the undefined port is a 'parent port', and declares to the node connected to the port that it is a child (steps S1608 and S1609).

At this time, the branch cannot declare to other nodes that it is a child until the number of the remaining undefined ports becomes 1. For example, in FIG. 14, the nodes B, C, and D recognize that they are branches, and receive a declaration from a leaf or another branch. The node D declares a set membership to the node C after determining the set memberships between D and E, and D and F. When the node C receives the declaration from the node D, it declares the set membership to the node B.

If there are no undefined ports as a result of the process in step S1608 (that is, when all connection ports of the branch become parent ports), then the branch recognizes that it is a root (step S1610).

For example, in FIG. 14, the node B in which all connection ports are parent ports now is recognized by other nodes as a root for arbitrating the communications in the 1394 network. Although the node B is determined as a route in this case, any of other nodes can be a root when the node B declares a set membership earlier than the node C. That is, any node can be a root depending on the declaring timing. Therefore, a root is not limited to the same node even with the same network configuration.

Thus, the declaration of the set members for all connection port enables each node to recognize a connection configuration in the 1394 network as a hierarchical structure (tree structure) (step S1611). The above mentioned parent node is a high order node in the hierarchy, and the child node is a low order node in the hierarchy.

(8) Assignment of Node ID

Figure 17:
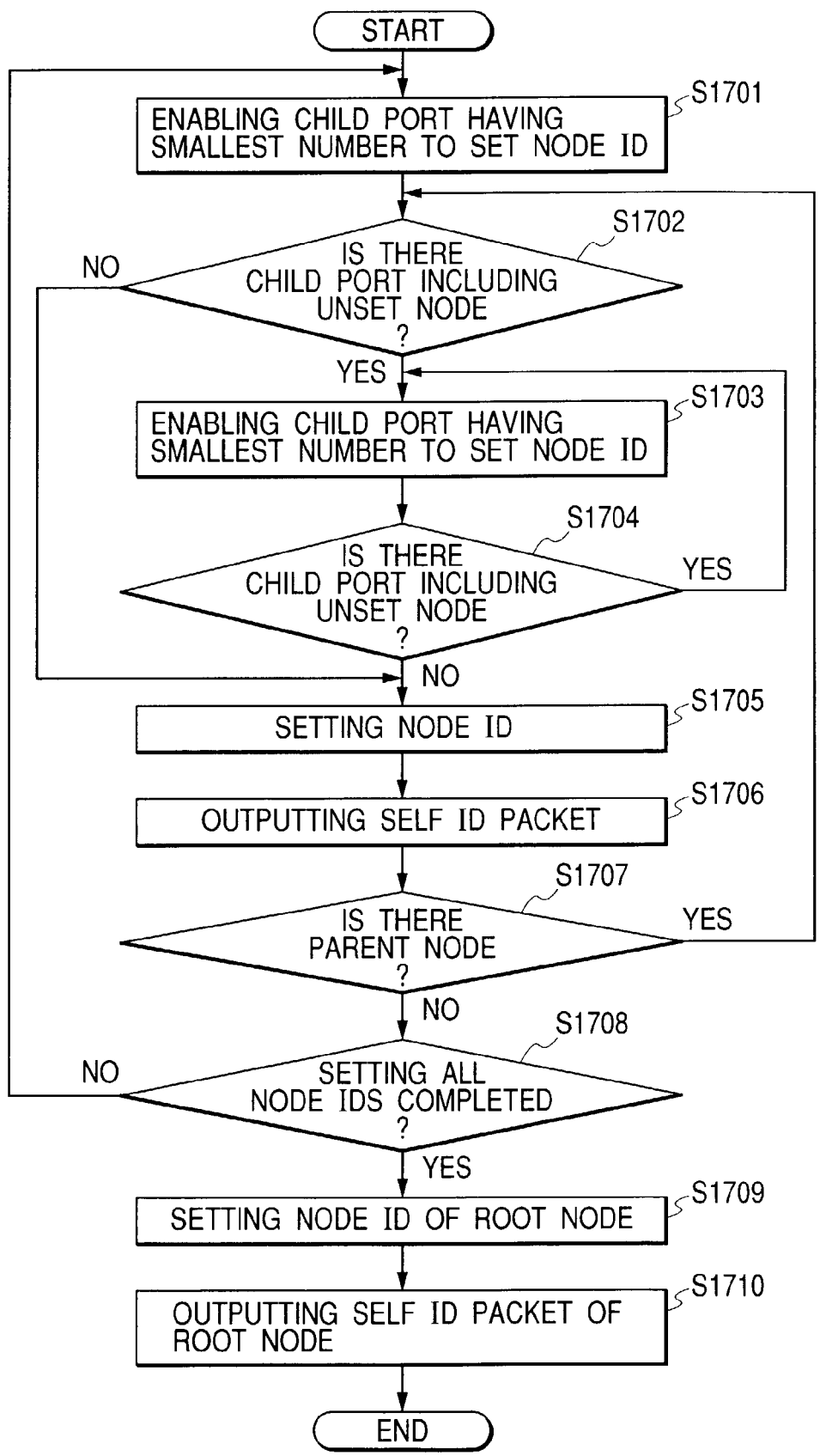
FIG. 17 is a flowchart showing in detail a process of step S1505 shown in FIG. 15 (that is, the process of automatically assigning a node ID of each node)

FIG. 17 is a flowchart showing in detail the process in step S1505 (that is, the process of automatically assigning a node ID of each node) shown in FIG. 15. In FIG. 17, the node ID is formed by a bus number and a node number. In the present embodiment, it is assumed that each node is connected to the same bus, and each node is assigned the same bus number.

In FIG. 17, the root enables a communications port having the smallest number in the child ports to which nodes whose node IDs have not been set are connected to set a node ID (step S1701).

In FIG. 17, when the root sets the node IDs of all nodes connected to the child port having the smallest number, it completes setting the child port, and performs the same controlling operation on the next smallest child port. When the IDs of all nodes connected to the child port have been completely set, the root sets its own node ID. The node number 0, 1, 2, . . . contained in the node ID is sequentially assigned to a leaf, a branch, . . . basically in this order. Therefore, the root has the largest node number.

In step S1701, a node enabled to set a node determines whether or not there are child ports including nodes whose node IDs have not been set in its child ports (step S1702).

In step S1702, when a child port including an unset node is detected, the above mentioned node enabled to set a node controls to give the node determines to a node directly connected to the child port (step S1703).

After the process in step S1703, the node enabled to set a node determines whether or not there are child ports including a node whose node ID has not been set in its child ports (step S1704). If there is a child port containing an unset node detected after the process in step S1704, then the node performs the process in step S1703 again.

If there is no child port including an unset node detected in step S1702 or S1704, then the node enabled to set a node sets its own node ID (step S1705).

The node which sets its own node ID broadcasts a self-ID packet containing information about its own node number, the connection status of a communications port, etc. (step S1706). To broadcast indicates transferring a communications port in a node to unspecified many nodes forming the 1394 network.

Each node receives the self-ID packet, and recognizes the node number assigned to each node, thereby being informed of the node number assigned to it. For example, in FIG. 14, the node B which is a root enables the node A connected to the communications port having the smallest port number of #1 to set a node ID. The node A assigns the node number of No. 0 to itself, and sets its own node ID formed by a bus number and a node number. Then, the node A broadcasts the self-ID packet including the node number.

Figure 18:
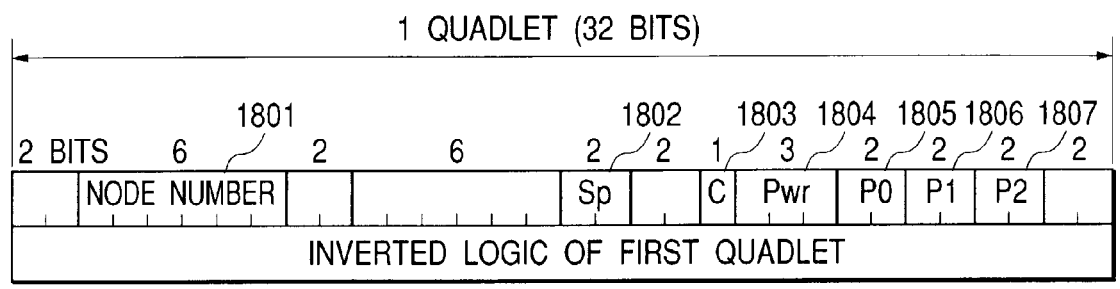
FIG. 18 shows a configuration of a self ID packet in the 1394 interface.

FIG. 18 shows an example of a configuration of a self-ID packet. In FIG. 18, reference numeral 1801 denotes a field storing the node number of a node transmitting a self ID packet; reference numeral 1802 denotes a field storing information about the applicable transfer speed; reference numeral 1803 denotes a field indicating the presence/absence of the bus managing capability (capability of a bus manager, etc.); and reference numeral 1804 denotes a field storing information about the features of the consumption and supply of electric power.

In FIG. 18, reference numeral 1805 denotes a field storing the information about the connection status (connected, unconnected, set membership of a communications port, etc.) of the communications port having the port number of #0; reference numeral 1806 denotes a field storing the information about the connection status (connected, unconnected, set membership of a communications port, etc.) of the communications port having the port number of #1; reference numeral 1807 denotes a field storing the information about the connection status (connected, unconnected, set membership of a communications port, etc.) of the communications port having the port number of #2.

When a node which transmits a self-ID packet has the capability of functioning as a bus manager, the contender bit shown in the field 1803 is set to 1.If it cannot function as a bus manager, then the contender bit is set to 0.

A bus manager is a node having the function of managing the electric power of a bus (managing information about whether or not the power can be supplied through a communications cable, whether or not the supply of power is required, etc. for each node), managing speed information (managing the maximum transfer speed between nodes according to the information about a transfer speed capable of correspondence of each node), managing the topology map information (managing the connection configuration of a network according to the set membership of a communi-cations port), optimizing a bus according to the topology map information, etc. based on various information contained in the above mentioned self-ID packet, and providing the information for other nodes. Using the functions, a bus manager node can manage the bus of the entire 1394 network.

After the process in step S1706, the node which has set the node ID determines whether or not there is a parent node (step S1707). If there is the parent node, then the parent node performs again the processes in and after step S1702, and gives permission to a node whose node ID has not been set.

If there is no parent node, then the node is determined to be a root. The root determines whether or not node IDs have been set for the nodes connected to all child ports (step S1708).

If the ID setting process has not been completed on all nodes in step S1708, then the root gives permission to the child port having the smallest number to set an ID in the child ports including the node (step S1701). Then, it performs the processes in and after step S1702.

When the ID setting process is completed on all nodes, the root sets its own node ID (step S1709). After setting the node ID, the root broadcasts a self-ID packet (step S1710).

By performing the above mentioned processes, the 1394 network can automatically assign a node ID to each node.

If a plurality of nodes can function as bus managers after the ID setting process, then the node having the largest node number can be a bus manager. That is, if the root having the largest node number in the network can function as a bus manager, then the root is the bus manager.

However, if the root cannot function as a bus manager, then the node having the second largest node number becomes a bus manager. Which node is a bus manager can be pointed out by checking the contender bit 1803 in the self-ID packet broadcast by each node.

(9) Arbitration

Figure 19A:
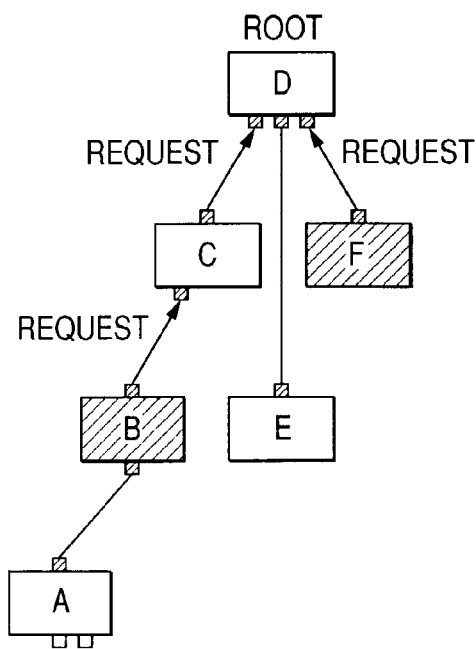
FIGS. 19A and 19B are explanatory views of an arbitration in the 1394 network.
Figure 19B:
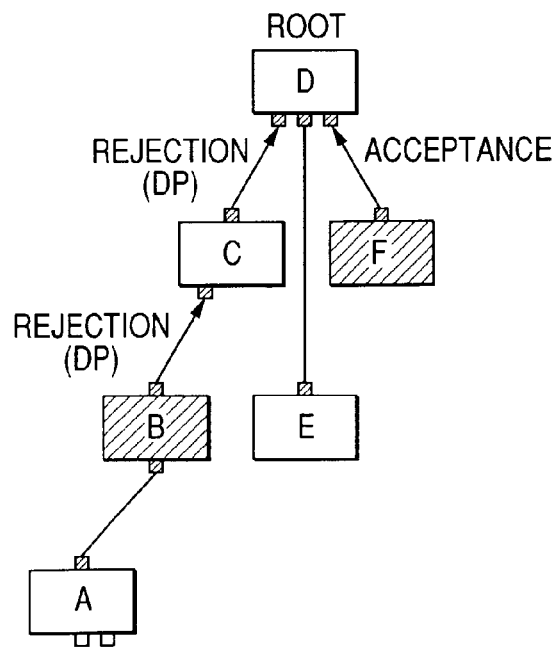

FIGS. 19A and 19B show an arbitration in the 1394 network shown in FIG. 1.

In the 1394 network, the arbitration for a bus-use right is performed before a data transfer. The 1394 network is a logical bus type network, and can transfer the same communications packet to all nodes in the network by relaying a communications packet transferred from each node through other nodes. Therefore, to prevent the conflict among communications packets, the arbitration is required. Thus, only one node can transfer a packet in a given time.

FIG. 19A shows the case in which a request for a bus-use right is issued by the nodes B and F.

When the arbitration starts, the nodes B and F issues a request for a bus-use right to the respective parent nodes. The parent node (that is, the node C) receiving the request from the node B relays the bus-use right to its parent node (that is, the node D). The request is transmitted to the root (node D) for final arbitration.

Upon receipt of the bus-use request, the root determines which node is to use the bus. The arbitration can be performed only by the node which can function as a root, and a node winning in the arbitration is given permission for use of bus.

FIG. 19B shows an accepted request of the node F and a rejected request of the node B.

The root transmits a node losing in the arbitration a DP (data prefix) packet to notify the node of the rejection. The rejected node sets its bus-use request on standby until the coming arbitration.

By controlling the arbitration as described above, the 1394 network can manage the bus-use right.

(10) Communications Cycle

The isochronous transfer mode and the asynchronous transfer mode can coexist in a time division manner in each communications cycle period. The period of a communications cycle is normally 125 µS.

Figure 20:
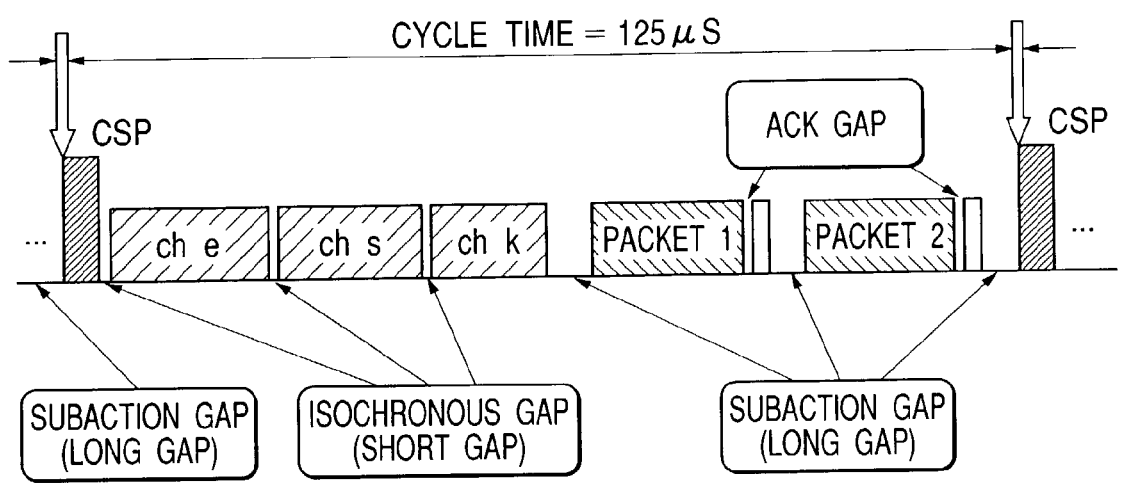
FIG. 20 is an explanatory view of the case in which an isochronous transfer mode and an asynchronous transfer mode coexist in one communications cycle.

FIG. 20 shows the case in which the isochronous transfer mode and the asynchronous transfer mode coexist in one communications cycle.

The isochronous transfer mode is prioritized over the asynchronous transfer mode because it is set such that the idle period (subaction gap) required to activate an asynchronous transfer is set longer than the idle period (isochronous gap) required to activate an isochronous transfer after a cycle start packet. Thus, the isochronous transfer is prioritized in execution over the asynchronous transfer.

In FIG. 20, when each communications cycle starts, a cycle start packet (hereinafter referred to as a CSP) is transferred from a predetermined node. Each node can count the same time as other nodes by adjusting the time using the CSP.

(11) Isochronous Transfer Mode

The isochronous transfer mode is a synchronization type transfer system. The isochronous mode transfer can be executed in a predetermined period after starting the communications cycle. The isochronous transfer mode is performed for each cycle to maintain a real time transfer.

The isochronous transfer mode is a transfer mode appropriate for the transfer of data which requires a transfer in real time such as moving picture data, voice data, etc. The isochronous transfer mode is not one-to-one communications as the asynchronous transfer mode, but corresponds to broadcasting communications. That is, a packet transmitted from a node is uniformly transferred to all nodes in the network. The isochronous transfer has no ack (acknowledgment code).

In FIG. 20, channel e (ch e), channel s (ch s), and channel k (ch k) indicate the periods in which each node performs an isochronous transfer. The 1394 interface assigns different channel numbers to distinguish a plurality of different isochronous transfers. Thus, the isochronous transfer can be performed between a plurality of nodes. The channel number does not specify a destination, but only assigns a logical number to data.

The isochronous gap shown in FIG. 20 indicates the idle state of a bus. After passing a predetermined time in the idle state, a node requesting an isochronous transfer determines that a bus can be used, and performs the arbitration.

Figure 21:
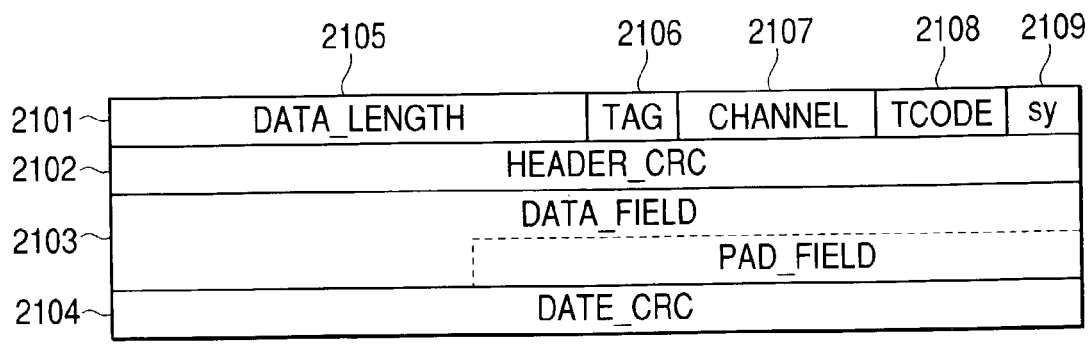
FIG. 21 shows a format of a communications packet transferred based on an isochronous transfer mode.

FIG. 21 shows a format of a communications packet transferred in the isochronous transfer mode. The communications packet transferred in the isochronous transfer mode is referred to as an isochronous packet.

In FIG. 21, the isochronous packet is formed by a header unit 2101, a header CRC 2102, a data unit 2103, and a data CRC 2104.

The header unit 2101 includes a field 2105 storing a data length of the data unit 2103, a field 2106 storing format information about an isochronous packet, a field 2107 storing a channel number of an isochronous packet, a field 2108 storing a transaction code (tcode) identifying the format of a packet and a process to be performed, and a field 2109 storing a synchronization code.

(12) Asynchronous Transfer Mode

An asynchronous transfer mode is an asynchronization type transfer system. The asynchronous transfer can be performed from the completion of the isochronous transfer period to the start of the next communications cycle (that is, the period up to the transfer of the CSP of the next communications cycle).

In FIG. 20, the initial subaction gap indicates the idle status of a bus. After the idle time has reached a predetermined value, a node requesting the asynchronous transfer determines that a bus can be used, and performs arbitration.

Figure 22:
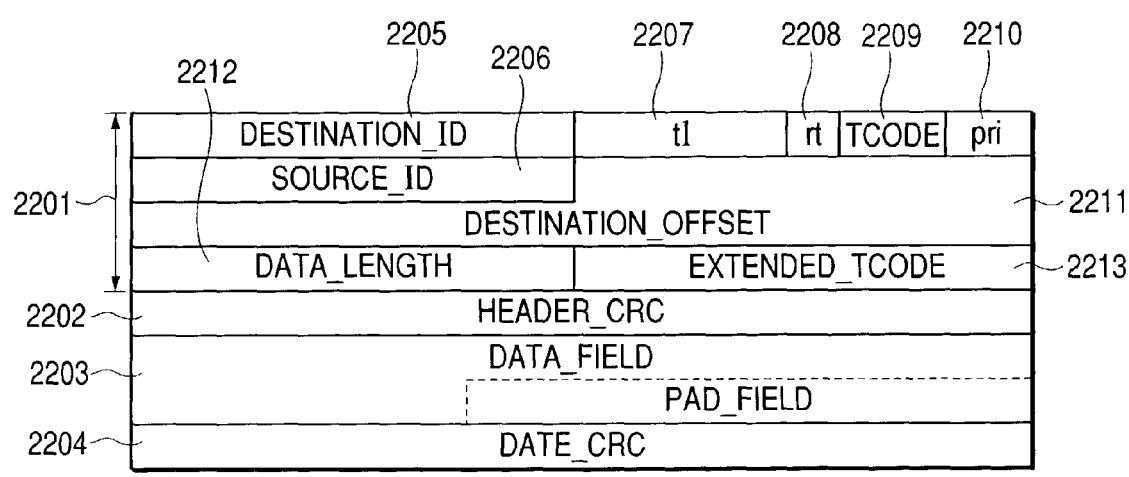
FIG. 22 shows a packet format in an asynchronous transfer mode according to the present invention.

The node which has obtained a bus-use right by the arbitration transfers the packet shown in FIG. 22 to a predetermined node. The node receiving the packet returns an ack (acknowledgment code) or a response packet after the ack gap.

FIG. 22 shows a format of a communications packet in an asynchronous transfer mode. The communications packet transferred in the asynchronous transfer mode is referred to an asynchronous packet.

In FIG. 22, the asynchronous packet is formed by a header unit 2201, a header CRC 2202, a data unit 2203, and a data CRC 2204.

In the header unit 2201, a field 2205 stores a node ID of a destination node, a field 2206 stores a node ID of a source node, a field 2207 stores a label indicating a series of transactions, a field 2208 stores a code indicating a retransmission status, a field 2209 stores the format of a packet and a transaction code (tcode) identifying a process to be performed, a field 2210 stores the priority, a field 2211 stores a destination memory address, a field 2212 stores the data length of a data unit, and a field 2213 stores an extended transaction code.

An asynchronous transfer is a one to one communications from a node to its partner node. A packet transferred from a source node is distributed to each node in the network, but all but the destination address are ignored. Therefore, the packet can be read by the destination node only.

When the time to transfer the next CSP is reached during the asynchronous transfer, the transfer is not compulsorily interrupted, but the next CSP is transmitted after the transfer is completed. Thus, when a communications cycle continues for 125 µS or longer, the next communications cycle period is shortened. Thus, the 1394 network can hold a substantially constant communications cycle.

(13) Device Map

Means for an application obtaining the topology of the 1394 network to generate a device map can be the following means in accordance with the IEEE 1394 Standard.

1. reading a topology map register of a bus manager
2. estimation from a self-ID packet at a bus reset However, in the above mentioned means 1 and 2, the topology in the order of cable connection by the set membership of each node can be obtained, but no topology of the physical correspondence in position cannot be obtained (there can also be the problem that unimplemented port can be viewed).

Furthermore, the information for generation of a device map can be held as a database other than configuration ROM. In this case, means for obtaining various information depends on the protocol for access to a database.

The configuration ROM itself and the function of reading the configuration ROM are held by the device in accordance with the IEEE 1394 Standard without fail. Then, by providing the function of storing the information about the position, function, etc. of a device in the configuration ROM of each node, and reading the information from the application, the application of each node can implement the function of displaying a device map independent of a specific protocol such as a database access, a data transfer, etc.

The configuration ROM can store a physical position and a function as information specific to a node, and can be used to realize the function of displaying a device map.

In this case, means for an application obtaining a 1394 network topology by a physical correspondence in position can be a method of obtaining the topology of the 1394 network by reading the configuration ROM of each node at a bus reset or a request from a user. Furthermore, by reading the configuration ROM by describing not only the physical position of a node in the configuration ROM, but also various node information such as a function, etc., the physical position of a node and the function information about each node can be obtained. When the application obtains the configuration ROM information about each node, an API for obtaining arbitrary configuration ROM information about a specified node is used.

Using the above mentioned means, the application of the device in the IEEE 1394 network can generate various device maps depending on the uses such as a physical topology map, a function map of each node, etc., thereby allowing a user to select a device having a necessary function.

<Outline of SBP-2>

The SBP-2 (serial bus protocol 2) is an IEEE 1394 bus dependent protocol which has been examined for standardization since 1996 as the project of the Technical Committee T10 under NCITS, and recognized as standardized ANSI NCITS 325-1998 in 1998. In layers, it is a high order command/data transport protocol over the transaction layer in IEEE 1394-1955. At first, the SBP-2 has been developed to enable a device in the IEEE 1394 to be operated by using an SCSI command. However, not only an SCSI command, but also other commands can be used.

The features of the SBP-2 are described below.

In a master slave model with an initiator/target configuration, an initiator is a master, and has all rights and responsibility in login, logout, task management, issuing a command, etc.

A shared memory model has the features of the IEEE 1394 as a bus model. (The contents of a request to a target such as a command, etc. are basically stored in the system memory, and the target which receives the request reads the contents of the system memory. Otherwise, the information such as a status requested by the system, etc. is written). That is, since the resources for communications can be concentrated in one position, the load of the resources can be reduced. Furthermore, since the target can read and write to the system memory at any speed, the design can be freely performed, and a high-speed process can be easily performed by accessing the system memory through H/W. (either a high performance model, or a low cost model can be realized). Since there is a system of describing a command group for exchanging messages as a series of link lists, the lowered efficiency by latency can be offset, high efficiency data communications can be realized by the feature of high-speed process of the IEEE 1394 bus.

Figure 23:
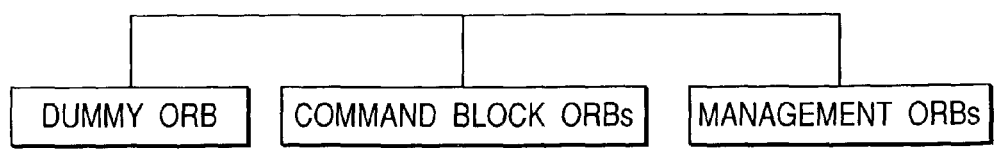
FIG. 23 shows an ORB type in an SBP-2.

With the command set independent structure, (various command sets can be utilized) the SBP-2 is a master slave model in which an initiator is a master and has all rights and responsibility, and even event starts from the operation of the initiator. Login and logout requests, a task management request, a command, etc. from the initiator are enclosed by a data structure referred to as an ORB (operation request block), and transmitted to a target. (Correctly, the initiator stores them in its memory, and the target reads them). FIG. 23 shows the main type of ORB.

Dummy ORB: When the target fetch agent is initialized, it is used in canceling a task, etc. The target processes it as no operation.

Figure 24:
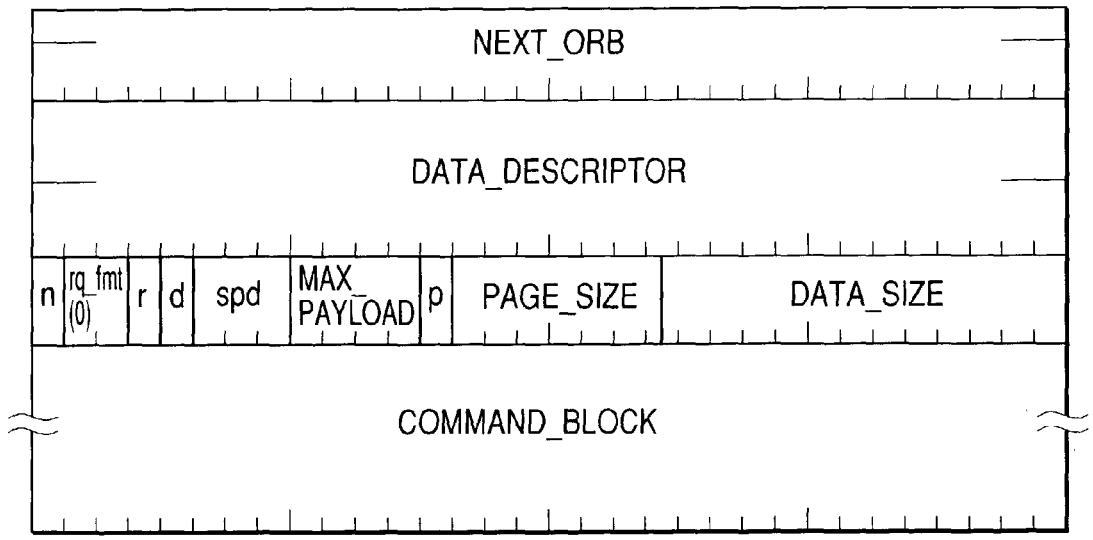
FIG. 24 shows a format of a command block ORB in the SBP-2.

Command Block ORB: Includes commands such as data transfer command, device control command, etc. It has data_descriptor and data_size field indicating the address and size of the corresponding data buffer or page table. Since it has a next ORB field indicating the address of the next Command Block ORB, the commands can be linked. (Refer to FIG. 24).

Figure 25:
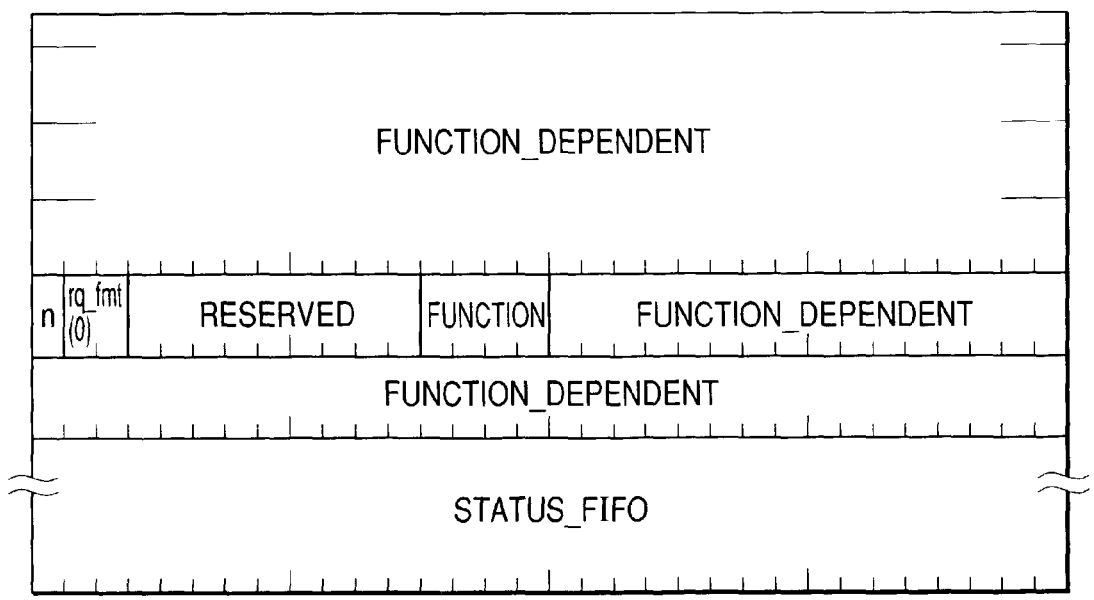
FIG. 25 shows a format of management ORB in the SBP-2.
Figure 26:
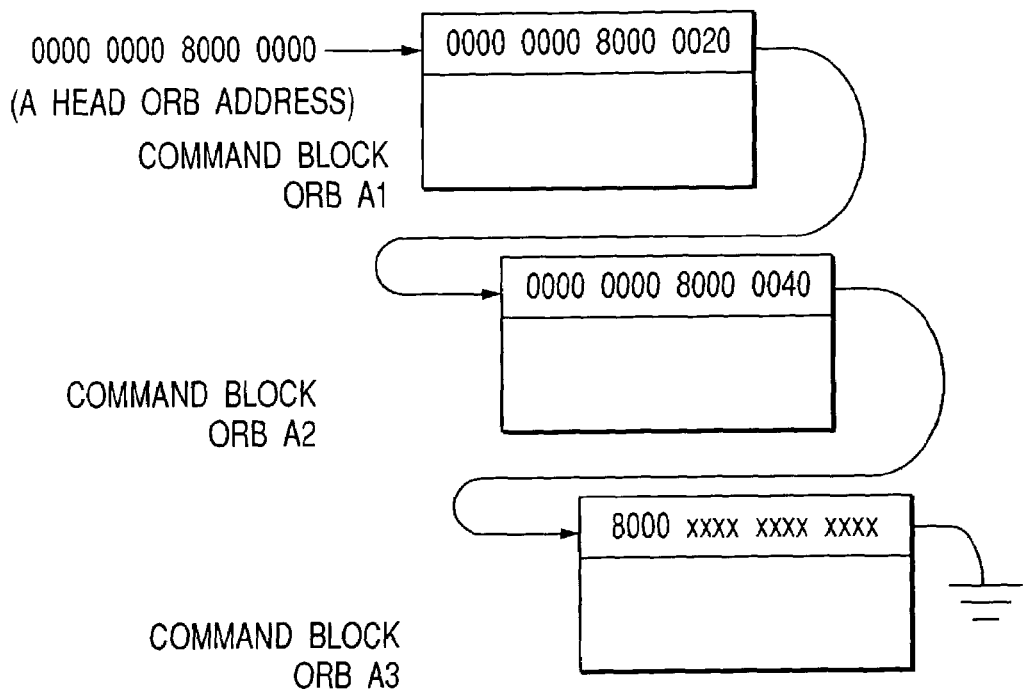
FIG. 26 shows a link list of a command block ORB in the SBP-2.

Management ORB: Includes a management request (access requests including login and logout, and task management request). It has a function field indicating a task management request (Abort Task Set, Target Reset, etc.), and StatusFIFO Field indicating the address of a completion status from the target. (Refer to FIG. 25). Among them, for the Management ORB, the initiator cannot issue the next ORB until the target returns a response, but the Command Block ORB including the Dummy ORB can be issued as a series of commands in the form of a Linked List as shown in FIG. 26. That is, since the Command Block ORB has a field indicating the address of the next ORB as the next ORB field as shown in FIG. 2, commands can be linked sequentially. When the field is null, it indicates that there are no subsequent ORB.

Figure 27:
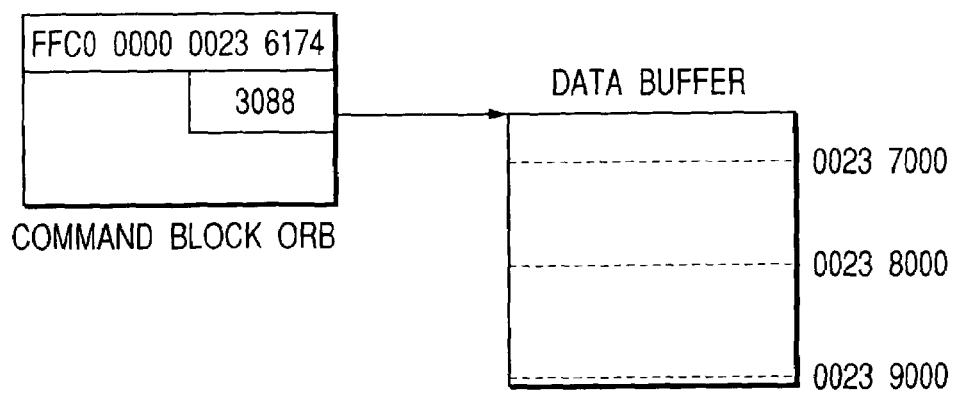
FIG. 27 shows a direct access of a data buffer in the SBP-2.
Figure 28:
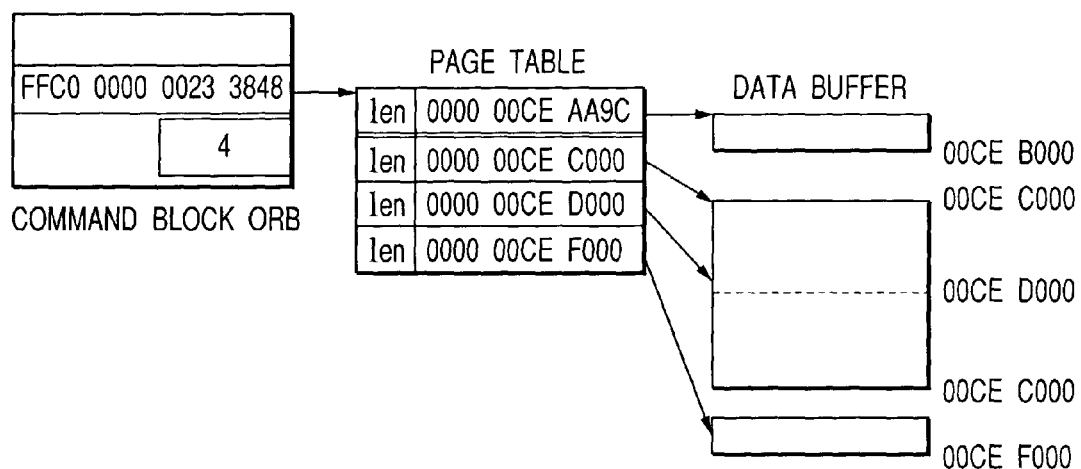
FIG. 28 shows a use of a page table in the SBP-2.

In other fields of the Command Block ORB, there are Field (data descriptor and data size) indicating the address and size of Data Buffer or PageTable. If the contents of Command are Write Command, the target accesses the Data Buffer in the system memory indicated by data_descriptor, and reads Write Data therefrom. If the contents of Command are Read Command, the target accesses the Data Buffer in the system memory indicated by data_descriptor, and writes Data requested by the Command. FIGS. 27 and 28 show the case in which Databuffer is directly indicated, and the case in which it is indicated through PageTable. Page Table allows the Data buffer in physically discontinuous areas to be processed continuously, thereby requiring no physical rearrangement of continuous logical areas using virtual storage.

The system on the target side for performing various requests from the initiator is referred to as Agent. The Agent can be Management Agent for performing Management ORB, and Command Block Agent for performing Command Block ORB.

The Management Agent has Management Agent Register so that the initiator can notifies the target of the address of Management ORB.

The Command Block Agent fetches a command from the Command Linked List of the initiator, and is referred to as a fetch agent. The fetch agent has an ORB Pointer Register for use by the initiator to store the leading address of the Command Block ORB, and the Command Block Agent Register containing Door Bell Register through which the initiator notifies the target that the Command is to be fetched.

Figure 29:
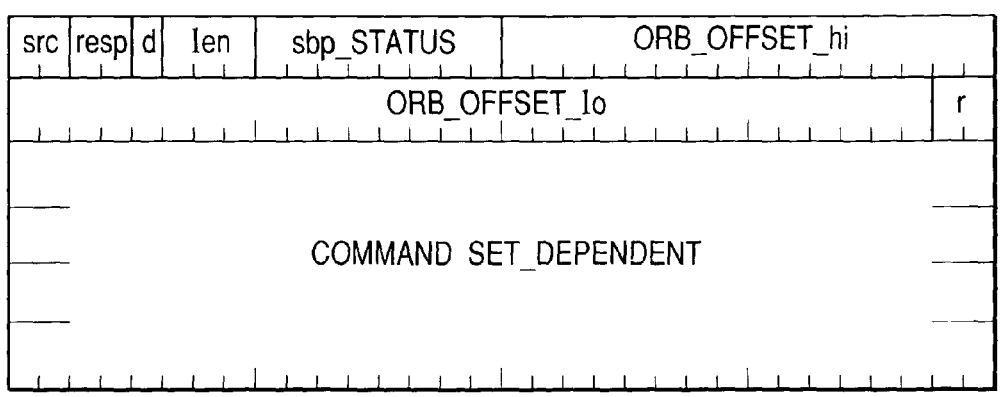
FIG. 29 shows a format of a status FIFO in the SBP-2.

When the target completes the execution of the ORB from the initiator, it stores the Status of the completion of the execution in the form of the data structure of Status Block (regardless of the successful or unsuccessful completion) at the address indicated by the status FIFO address of the initiator. FIG. 29 shows an example of Status Block.

The target can store the maximum of 32-byte status information. In the case of the Management ORB, the status FIFO address is explicitly provided as a part of the ORB for the Status FIFO field shown in FIG. 25. Therefore, the target stores the Status Block at a specified address. In other cases, the Status Block is stored in the status FIFO obtained from the Context of the Fetch agent. In the case of Command block ORB, the initiator provides the status FIFO address as a part of a login request.

Normally, the target returns a response by writing the Status Block at the status FIFO address in response to the ORB issued by the initiator. However, if a change occurs on the Device side, and influences the Logical Unit, then it autonomously returns the Unsolicited Status without a request from the initiator. In this case, the status FIFO address is status FIFO address provided by the initiator when initiator issues a login request.

Figure 30:
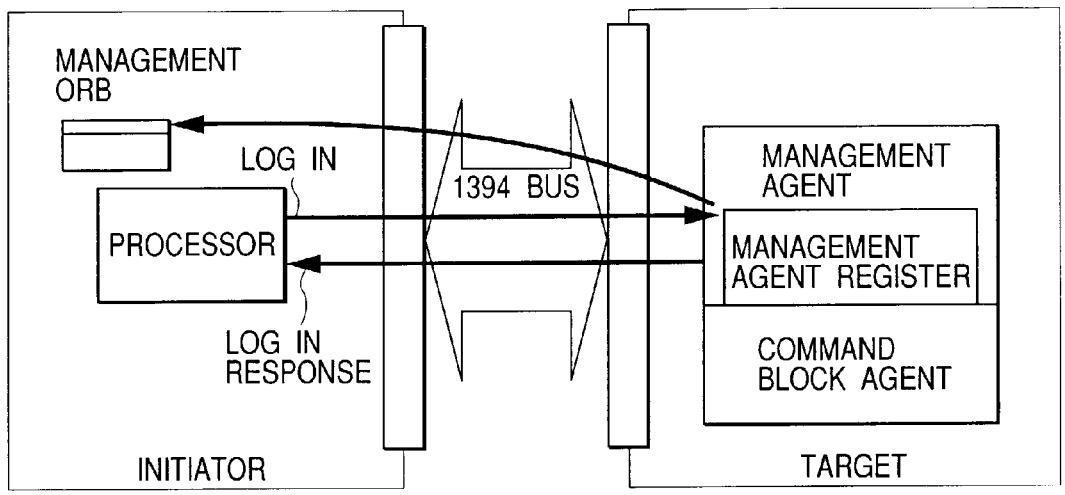
FIG. 30 shows a login operation in the SBP-2.

The operations of the initiator and the target in the SBP-2 is explained using an operation model shown in FIG. 30.

The operation in the SBP-2 starts with the issue of the Management ORB (LoginORB) by the initiator for a Login request to the target. In response to the request from the initiator, the target returns a Login response. When the Login request is accepted (refer to FIG. 30), the target returns the leading address of the Command Block Agent Register as a Login Response.

When the Login request is accepted, the Management Agent of the target receives the subsequent Task Management from the initiator. The initiator issues the Task Management ORB, and transmits/receives necessary information in performing a task to and from the target.

Figure 31:
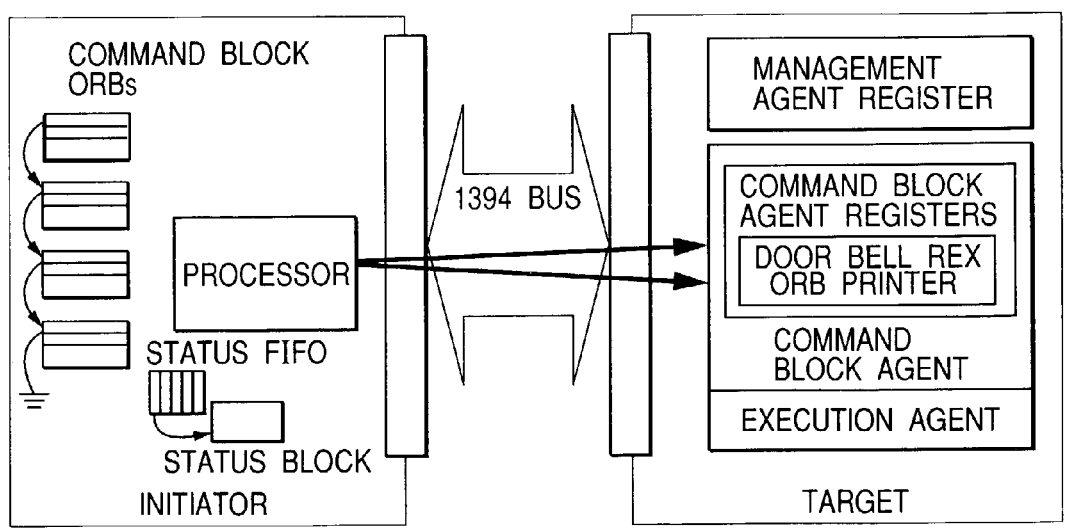
FIG. 31 shows a first operation of performing a task in the SBP-2.
Figure 32:
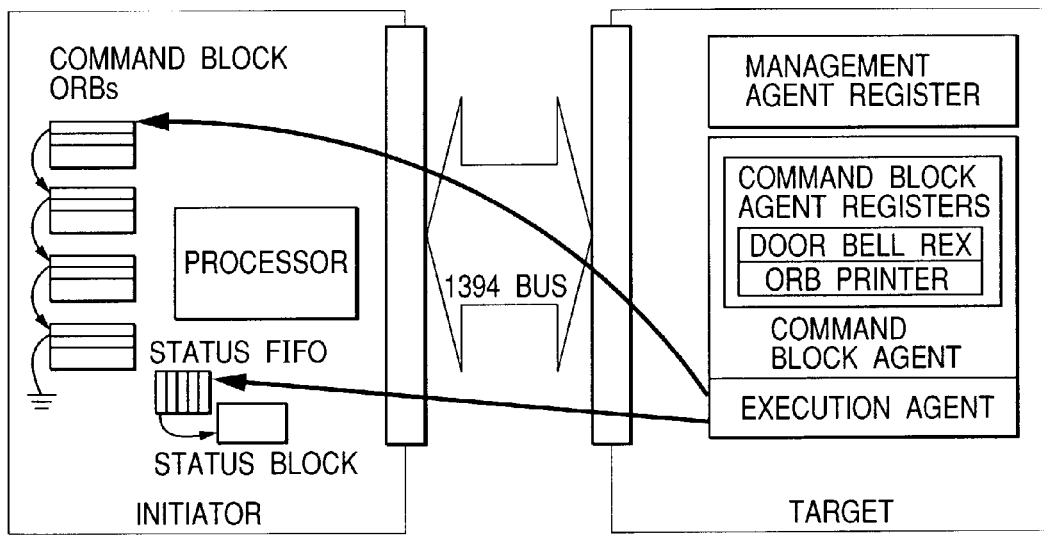
FIG. 32 shows an operation of a command ORB in the SBP-2.

In response to the ORB from the initiator, the target returns a response by writing the Status Block to the Status FIFO. However, when a change occurs on the device side, and influences the Logical Unit, then it autonomously returns an unsolicited status without a request from the initiator as described above. After communications relating to the Task Management, the initiator forms the necessary Command Block ORB (list) in its own memory area, and writes the leading address of the ORB to the ORB Pointer of the Command Block Agent Register of the target, or rings the Door Bell Register of the Command Block Agent Register that there is the ORB in the initiator to be transmitted to the target (FIG. 31). The target accesses the memory of the initiator according to the leading address information of the ORB written to the ORB Pointer, and sequentially processes the ORB (FIG. 32).

The execution Model of the Task can be Ordered Model and Unordered Model. In the Ordered Model, the ORB is processed in the order of the list, and the completion status of the target is sequentially returned. In the Unordered Model, there is no restrictions on the execution order of the ORB, but the initiator is to be responsible for the same execution result in any order. The data transfer from the initiator to the target is performed by the Read Transaction from the target to the system memory. On the other hand, the data transfer from the target to the initiator is performed by the Write Transaction to the system memory. That is, the target leads the process regardless of the direction of the transfer of the Data Buffer. Namely, the target can read data from the system memory at a convenient pace for the target. The initiator rewrites the next_address of the last ORB in the List to next ORB address even while the target processes the ORB, and rings the Door Bell Register of the target again to notify the target of the change, thereby adding the ORB to the Linked List. The target returns the completion status (Status Block) to the status FIFO address of the initiator.

Upon receipt of the returned completion status (Status Block), the initiator is informed that the target has completed the process on the ORB to be processed. The completed ORB can be removed from the Linked List of the Task set (unless the next_ORB field is null), and the initiator uses the available resources to add the next command, if it is necessary, at the end of the Command Linked List.

Thus, the ORB is processed, and the task is executed.

If the task is completed, and it is not necessary to continue access, then the initiator issues a Logout ORB, and the target returns a response, and the Logout is completed.

<Description of the Central Portion of the Present Embodiment>

Described below are the configuration of the central portion of the present embodiment and the connection device.

First the configuration of the 1394 serial bus interface unit is described as a common portion among the nodes of the host and the printer connected to the IEEE 1394 bus.

Figure 33:
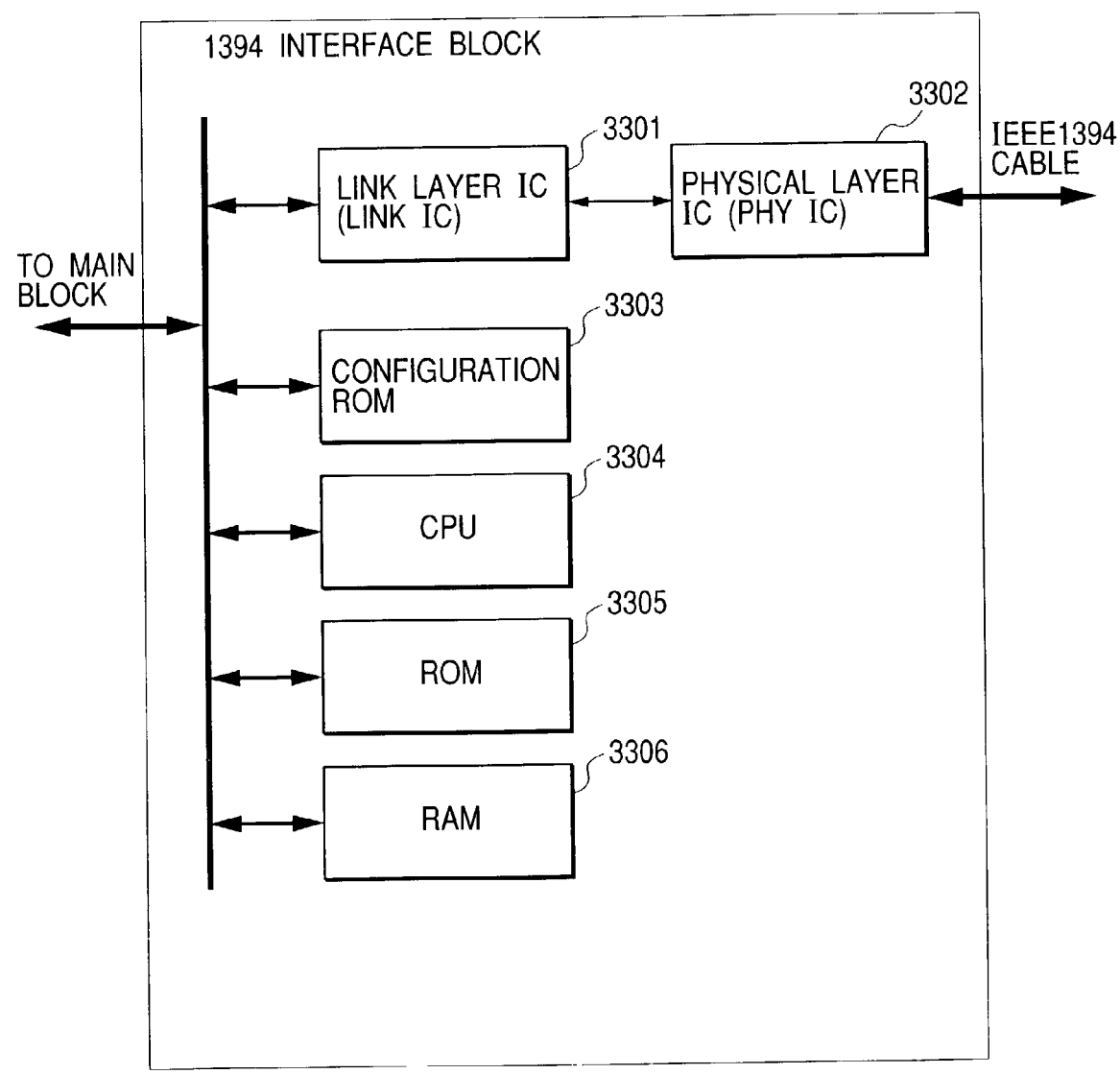
FIG. 33 is a block diagram of an IEEE interface unit between a printer and a host according to an embodiment of the present invention.

FIG. 33 is a block diagram of the basic configuration of the 1394 I/F block.

In FIG. 33, reference numeral 3302 denotes a physical layer control IC (PHYIC) for directly driving a 1394 serial bus, and realizes the function of the physical layer in the above mentioned <Outline of the technology of IEEE 1394>. The main functions are bus initialization, arbitration, encoding/decoding transmission data code, monitoring cable power, providing load terminating power (active connection recognition), interface with link layer IC.

Reference numeral 3301 denotes a link layer control IC (LINKIC) for performing an interface with the device main body and controlling data transfer of the PHYIC, and realizes the function of the link layer in the above mentioned <Outline of the technology of IEEE 1394>. The main functions of the IC are a transmission/reception FIFO for temporarily storing the transmission/reception data through the PHYIC, preparing a packet of transmission data, determining by PHYIC whether or not received data is to be transmitted to an assigned channel when the destination of the received data is the node address or isochronous transfer data, having the function of a receiver of checking an error in the data, and the interface with the device body.

In FIG. 33, reference numeral 3304 denotes a CPU for controlling the 1394 interface unit such as the link layer IC, PHYIC, etc. Reference numeral 3405 denotes a ROM storing the controlling program of the interface unit.

Reference numeral 3306 denotes a RAM, and is used as a data buffer storing transmission/reception data, a control work area, and a data area of various registers mapped at the 1394 address.

In FIG. 33, reference numeral 3303 denotes configuration ROM, and stores identification condition specific to each piece of equipment, a communications condition, etc. The data format of the ROM is in accordance with the format prescribed by the IEEE 1212 Standard and the IEEE 1394 Standard as described above in <Outline of technology of IEEE 1394>.

Figure 34:
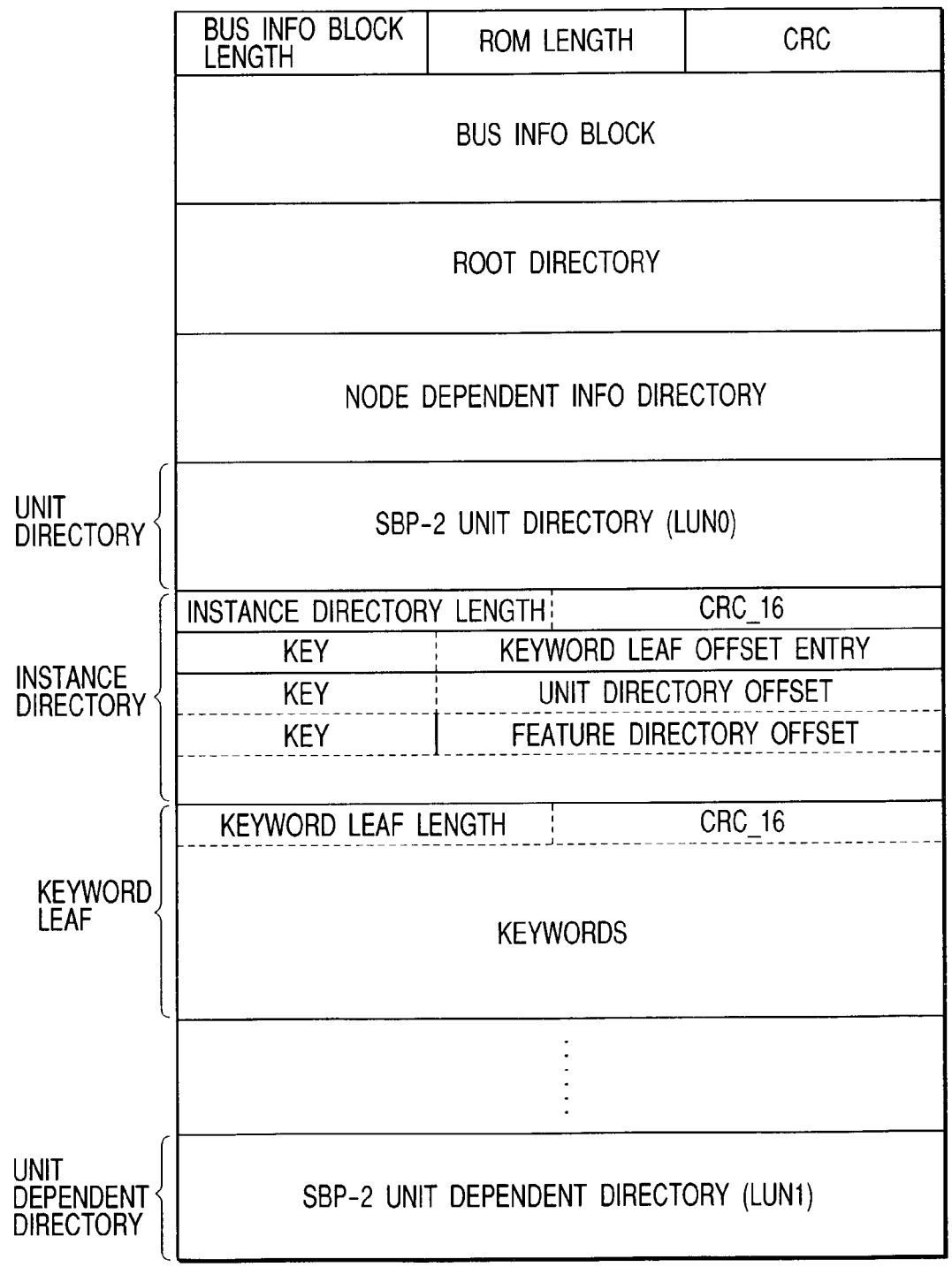
FIG. 34 shows a configuration ROM of a printer according to an embodiment of the present invention.

Each node is provided with configuration ROM in the common format as shown in FIG. 34. The software unit information of each device is stored in the unit directory, and the information specific to node is stored in the node dependent info directory.

In the case of the printer according to the present invention embodiment, to support the SBP-2 as a communications protocol, and to provide two logical channels of the SBP-2 (hereinafter referred to as LUN), there are ID identifying the SBP-2 in the unit directory, and a directory for identification of the two LUNs, that is, the LUNs 0 and 1.

Figure 35:
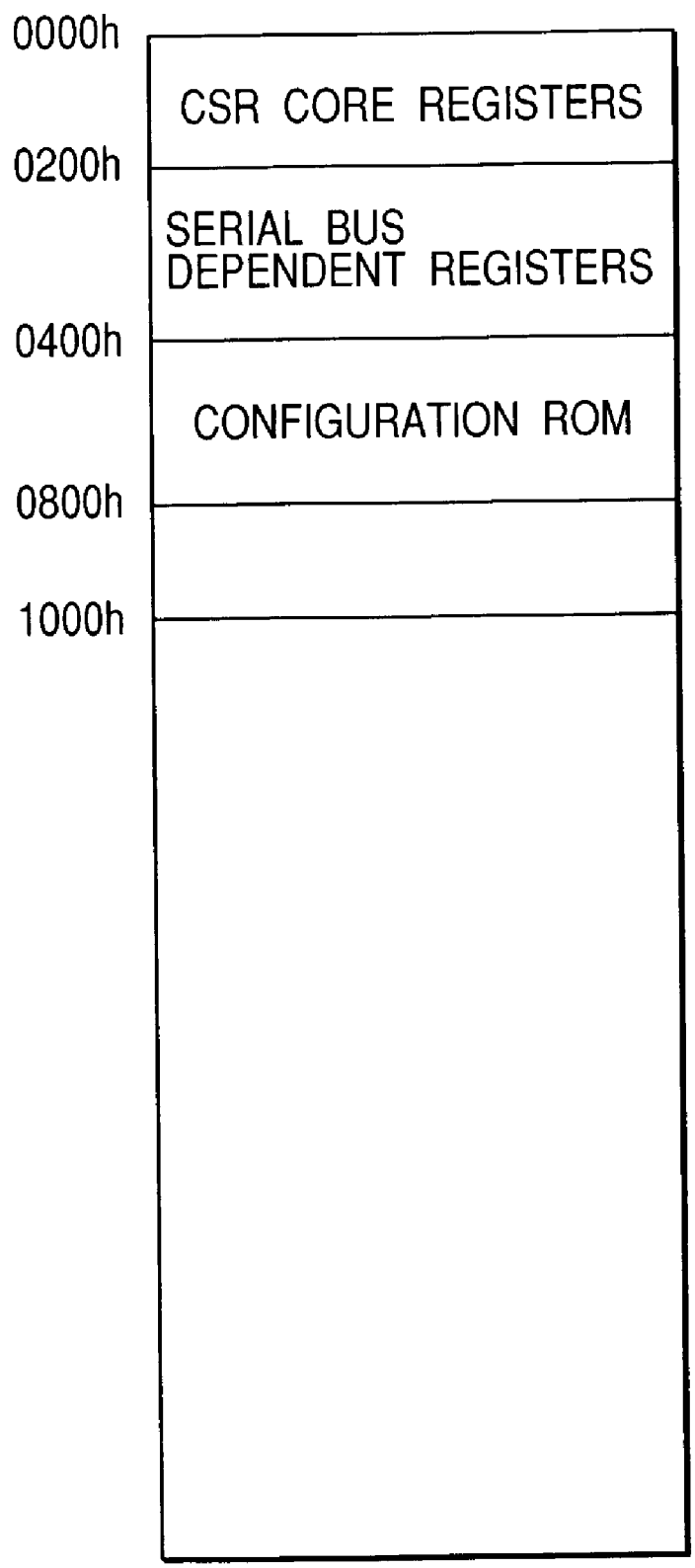
FIG. 35 shows an 1394 address space of a printer according to an embodiment of the present invention.

As described above by referring to the <Outline of technology of IEEE 1394>, the last 28 bits in the address settings of the 1394 serial bus are reserved as an area of unique data of each piece of equipment which can be accessed by other devices connected to a serial bus. FIG. 35 shows the 28-bit address space.

In the area at the address numbers 0000 to 0200, a CSR core register group is arranged.

These registers exist as the basic functions for node management determined by the CSR architecture as shown in FIG. 11.

The area at the address numbers 0200 to 0400 is defined as an area storing a register for a serial bus by the CSR architecture. In FIG. 36, as described above in the <Outline of technology of IEEE 1394>, the register at the address numbers 0200 to 0230 is defined, and the register is arranged for synchronization of data transfer, power supply, bus resource management, etc. This portion is the same as the portion shown in FIG. 12.

The above mentioned configuration ROM is arranged in the area at the address numbers 400 to 800.

The area at the address numbers 0800 to 1000 stores the topology information about the current 1394 bus, or the information about the transfer speed between nodes.

The area at and after the address number 1000 is referred to as a unit space, and a register for the operation specific to each device is arranged. In this area, a register group prescribed by a high order protocol supported by each device, a data transfer memory mapped buffer area, and a register specific to each equipment are arranged.

The operations of the host and printer shown in FIG. 1 and provided with the 1394 interface are described below. In FIG. 1, as described above, the host 1a as an initiator using the SBP-2 protocol is a system for performing communications with the printer device 1b which is the target of SBP-2. In the case of the communications system, communications are established between the host and the printer based on the printer control communications command protocol predetermined as a high order command set of the SBP-2 protocol, and a process is performed according to the specification of a command.

The printer of the target 1b is provided with a plurality of logical units LUN 0 and LUN 1 which provide the function of receiving and processing the printer control data transmitted from the host to the printer, and the print data, and the function of transmitting the current printer status data to the host corresponding to the control to the printer. Additionally, it is provided with a management agent MA for processing a management request such as establishing and disconnecting a communications channel for the plurality of logical units.

The logical units LUN 0 and LUN 1 respectively manage the systems referred to as fetch agents FA0 and FA1 formed by command block agents CA 0 and CA 1 for transmission and reception of data according to the SBP-2 protocol, and execution agents EA 0 and EA 1 for performing a predetermined process corresponding to data and a command. When the initiator 1 allows any of the logical units LUN 0 and LUN 1 of the target 2 to perform a predetermined function, the fetch agent of the logical unit LUN 0 and LUN 1 performs the predetermined process.

Each of the fetch agents sequentially processes the ORB issued by the initiator according to the Ordered Model in the SBP-2, thereby performing the predetermined process.

In the printer control communications command protocol used in the present embodiment, the LUN 0 is used as a data transfer channel from a host to a printer as model specifications, and the LUN 1 is used as a data transfer channel from the printer to the host.

According to the present embodiment, the initiator is appended to the memory area according to the SBP-2 protocol for data communications, and command information defined by the printer control communications command protocol is added to the command set dependent field of the ORB received by the fetch agent of the target. The print data which is application data, and printer status data are stored in the data buffer referred to by the ORB.

The format of the ORB is shown in FIG. 37. FIG. 38 shows the command of the printer control communications command protocol used in the present embodiment.

The host 1 which is an initiator connects the logical units LUN 0 and LUN 1 of the printer to the target 2 to perform a print job.

Upon receipt of a request to start communications to the logical units LUN 0 and LUN 1 from the host to the printer, that is, a login request, the management agent MA returns, a response containing a base address which is an entry point for access to the fetch agents FA 0 and FA 1 for management of the corresponding logical unit to the initiator as a login response, thereby permitting the initiator 1 to establish communications.

The host issues a login request to the LUN 0 and LUN 1, and starts communications if the communications are permitted.

When application data including a control command is transmitted from the host to the printer, the direction bit of the ORB is set to 0 in the LUN 0 logical channel, that is, reading a target of the corresponding data buffer is specified to add a predetermined write command, the ORB prepared in the data buffer is appended to the application data, and fetch of the ORB is triggered for the fetch agent of the printer.

The target which receives a fetch activation request by the access of the ORB pointer fetches the ORB according to the pointer information included in the request using the read transaction of the IEEE 1394. The data buffer is accessed according to the command added to the ORB. In this case, the write command to the LUN 0, that is, the data transfer from the host to the printer, is executed, and the fetch agent performs the process of reading data from the data buffer. The execution agent performs an operation according to the read application data. The operation includes, for example, transmitting control data from a host to a printer by transmitting print data and the print specify command, initializing printer device, etc.

When the host requests to obtain the status of the printer during the print job, a data buffer for storing the status information is prepared, the pointer information and the ORB obtained by adding the read command are appended, and the ORB fetch is triggered for the printer LUN 1 logical channel fetch agent.

As in the NUN 0, the target which receives a fetch activation request by the access of the ORB pointer fetches the ORB according to the pointer information contained in the request using the read transaction of the IEEE 1394. The data buffer is accessed according to the command added to the ORB. In this case, the read command to the LUN 1 is issued, that is, the data transfer is performed to the host by writing data from the printer to the host. The execution agent prepares status data at a status obtain request, and the fetch agent performs the process of writing status data to the data buffer.

As described above, the print job is constantly performed. Then, the operation performed when data transfer relating to the print job becomes stagnant for any reason is described below by referring to an example.

As described above, if the printing process is interrupted and cannot be resumed by the no-ink or paper-jam state when data transfer is performed while the print job is performed using two logical channels of the LUN 0 and LUN 1, then the data fetched by the fetch engine through the LUN 0 and obtained as print data by the print buffer in the printer by the execution agent cannot be used in the printing process. Thus, if the data in the print buffer is not processed, the execution agent and the fetch agent stop their operations because they cannot perform the data transfer process.

As a result, the data transfer of the logical channel of the LUN 0 becomes stagnant.

The data transfer layer in the printer control software on the host side detects the data transfer error with the printer with the lapse of time for a predetermined data transfer time-out, and notifies the high order printer control application layer of the data write error.

The high order application layer of the host which receives the data transfer error detects the printer error status, and issues to the printer a command to initialize the printer.

When the printer initialize command is issued, it is the data transfer from a host to a printer, and data is transferred through the LUN 0 logical channel.

The data transfer layer sets the ORB direction bit to 0 in the LUN 0 logical channel, the ORB to which a predetermined init command is added is appended, and the ORB fetch is triggered for the fetch agent of the printer.

However, as described above, the data transfer is stagnant through the LUN 0, and the fetching operation is not performed by the printer on the ORB with the initial command added, and the command issue becomes data transfer time-out.

Described below is the portion different from the example of the communications system according to the present embodiment.

The printer control communications command protocol used in the present embodiment can use the LUN 0 as a data transfer channel from a host to a printer as model specifications, use the LUN 1 as a data transfer channel from the printer to the host, that is, use the logical channel depending on the data transfer direction. However, in an exception, a command can be issued from the host through both logical channels of the LUN 0 and the LUN 1 only by the printer initialize command, and it can be received by the printer.

It is not realized by specifying the issue of the printer initialize command in the data buffer referred to by the pointer from the ORB, but is realized by specifying it in the command set dependent field of the ORB.

When the issue of the ORB to the LUN 0 logical channel with the initialize command added encounters a data transfer time-out, the data transfer layer in the printer control software of the host issues the ORB to the LUN 1 logical channel with the same initialize command added.

The LUN 1 logical channel, that is, the ORB appended to the predetermined LUN 1 as a data transfer channel from the printer to the host, is read by the LUN 1 fetch engine of the printer. To the ORB issued to the LUN 1, the execution agent performs data write to the each specified data buffer at a command other than the initialize command. However, according to the specifications of the printer control communications command protocol used in the present embodiment, the printer initializing operation is performed after detecting the initialize command in the ORB.

In the above mentioned embodiment of the present invention, the serial bus can be a bus disclosed in the IEEE 1394 Standard, but can also be a bus applicable to the USB Standard.

Although a host computer is disclosed as an initiator and an ink jet printer is disclosed as a target according to the present embodiment, the present invention does not limit the type of device. That is, other types of devices can be applied. For example, a digital camera can be used as an initiator, and a hard disk unit can be used as a target device.

Additionally, according to the present embodiment, a communications channel (logical channel) in accordance with the IEEE 1394 Standard as a logical unit is exemplified. However, any logical channel can be used depending on the type of serial bus according to the present invention. The method of using a data buffer corresponding to a logical unit can be any other variation than the one exemplified in the present embodiment.

Although the communications channel (LUN) from a conventional initiator to a target enters communications disabled status for any reason, and a command cannot be smoothly issued by utilizing the features of the SBP-2 and allowing a part of a control command issued from an initiator to a target to be issued to and received by any LUN when one LUN is used in the data communications from an initiator to a target while another LUN is used in the data communications from a target to an initiator in the method of using a data buffer corresponding to the ORB of each LUN between the devices communicating with the configuration of a plurality of logical units (LUN) of the SBP-2, a control command can be issued using another channel, and the initialize command in the stagnant communications channel can be issued to the target according to the present embodiment.

Although when a logical communications unit from an initiator to a target becomes disabled for any reason, and a command cannot be smoothly issued, another logical communications unit can be used to issue a control command, thereby issuing an initialize command of the stagnant communications unit to the target according to the present invention.

What is claimed is:

1. A data processing method for communications performed between two nodes by a plurality of logical communication units, wherein:

in the plurality of logical communication units, a first logical communication unit is used in data communication from an initiator to a target via a first communication channel, and a second logical communication unit is used in data communication from a target to an initiator via a second communication channel different from the first communication channel;

the first logical communication unit communicates a first data block between the initiator and the target, wherein the first data block makes the target read data from a storage area of the initiator in accordance with the first data block;

the second logical communication unit communicates a second data block between the initiator and the target, wherein the second data block makes the target write data into a storage area of the initiator in accordance with the second data block; and the target reads control data for a predetermined operation to be performed by the target from the storage area of the initiator in accordance with the first data block and the second logical communication unit communicates a third data block including a command for the predetermined operation.

2. The data processing method according to claim 1, wherein the two nodes are connected to each other via a serial bus adapted to at least one of an IEEE 1394 Standard and a USB Standard.

3. The data processing method according to claim 1, wherein the target is a printer.

4. The data processing method according to claim 1, wherein the initiator is a host.

5. The data processing method according to claim 4, wherein at least one of the first or the second logical communication unit is a logical unit (LUN) in an SBP-2 Standard.

6. A data processing apparatus for performing communications with an external apparatus, comprising:
a first logical unit adapted to acquire a first data block from the external apparatus and read data from a storage area of the external apparatus in accordance with the first data block so as to perform data communication from the external apparatus to the data processing apparatus via a first communication channel; and
a second logical unit adapted to acquire a second data block from the external apparatus and write data into a storage area of the external apparatus in accordance with the second data block so as to perform data communication from the data processing apparatus to the external apparatus via a second communication channel different from the first communication channel,
wherein the first logical unit reads control data for a predetermined operation to be performed by the data processing apparatus from the storage area of the external apparatus in accordance with the first data block and the second logical unit acquires a third data block including a command for the predetermined operation from the external apparatus.

7. The data processing apparatus according to claim 6, wherein said data processing apparatus and the external apparatus are connected to each other via a serial bus adapted to at least one of an IEEE 1394 Standard and a USB Standard.

8. The data processing apparatus according to claim 6, wherein the data processing apparatus is a printer.

9. The data processing apparatus according to claim 6, wherein the external apparatus is a host computer.

10. The data processing apparatus according to claim 6, wherein at least one of the first or the second logical unit is a logical unit (LUN) in an SBP-2 Standard.

11. A communication protocol for communications performed between two nodes by a plurality of logical communication units, wherein:
in the plurality of logical communication units, a first logical communication unit is used in data communication from an initiator to a target via a first communication channel, and a second logical communication unit is used in data communication from a target to an initiator via a second communication channel different from the first communication channel;
the first logical communication unit communicates a first data block between the initiator and the target, wherein the first data block makes the target read data from a storage area of the initiator in accordance with the first data block;
the second logical communication unit communicates a second data block between the initiator and the target, wherein the second data block makes the target write data into a storage area of the initiator in accordance with the second data block; and
the target reads control data for a predetermined operation to be performed by the target from the storage area of the initiator in accordance with the first data block and the second logical communication unit communicates a third data block including a command for the predetermined operation.

12. The communication protocol according to claim 11, wherein the target is a printer.

13. The communication protocol according to claim 11, wherein the initiator is a host computer.

14. A printer which executes the communication protocol according to claim 11.

15. A host computer which executes the communication protocol according to claim 11.

16. The data processing method according to claim 1, wherein the first and second data buffers coffespond to an ORB (Operation Request Block) of each LUN (Logical Unit).

17. A data processing program stored on a computer-readable storage medium such that, when executed by a computer, the program causes the computer to execute a data processing method for communications performed between two nodes by a plurality of logical communication units, wherein:
in the plurality of logical communication units, a first logical communication unit is used in data communication from an initiator to a target via a first communication channel, and a second logical communication unit is used in data communication from a target to an initiator via a second communication channel different from the first communication channel;
the first logical communication unit communicates a first data block between the initiator and the target, wherein the first data block makes the target read data from a storage area of the initiator in accordance with the first data block;
the second logical communication unit communicates a second data block between the initiator and the target, wherein the second data block makes the target write data into a storage area of the initiator in accordance with the second data block; and
the target reads control data for a predetermined operation to be performed by the target from the storage area of the initiator in accordance with the first data block and the second logical communication unit communicates a third data block including a command for the predetermined operation.

18. The data processing method according to claim 1, wherein, if the second logical communication unit communicates the third data block including the command for the predetermined operation, the target performs the predetermined operation without writing data into the storage area of the initiator in accordance with the third data block.

19. The data processing method according to claim 1, wherein the predetermined operation is initialization.

20. The data processing method according to claim 1, wherein, if the first logical communication unit cannot communicate a fourth data block including a command for the predetermined operation during a predetermined time, the second logical communication unit communicates the third data block.

21. The data processing apparatus according to claim 6, wherein, if said second logical unit acquires the third data block including the command for the predetermined operation, said data processing apparatus performs the predetermined operation without writing data into the storage area of the external apparatus in accordance with the third data block.

22. The data processing apparatus according to claim 6, wherein the predetermined operation is initialization of said data processing apparatus.

23. The data processing apparatus according to claim 6, wherein, if said first logical unit does not acquire a fourth data block including a command for the predetermined operation during a predetermined time, said second logical unit acquires the third data block.

24. A data processing apparatus for performing communications with an external apparatus, comprising:
   a first logical unit adapted to send to the external apparatus a first data block which makes the external apparatus read data from a storage area of the data processing apparatus in accordance with the first data block so as to perform data communication from the data processing apparatus to the external apparatus via a first communication channel; and
   a second logical unit adapted to send to the external apparatus a second data block which makes the external apparatus write data into a storage area of the data processing apparatus in accordance with the second data block so as to perform data communication from the external apparatus to the data processing apparatus via a second communication channel different from the first communication channel,
   wherein the external apparatus reads control data for a predetermined operation to be performed by the external apparatus from the storage area of the data processing apparatus in accordance with the first block and the second logical unit sends to the external apparatus a third data block including a command for the predetermined operation.

25. The data processing apparatus according to claim 24, wherein, if said second logical unit sends to the external apparatus the third data block including the command for the predetermined operation, the external apparatus performs the predetermined operation without writing data into the storage area of the data processing apparatus in accordance with the third data block.

26. The data processing apparatus according to claim 24, wherein the predetermined operation is initialization of the external apparatus.

27. The data processing apparatus according to claim 24, wherein, if said first logical unit does not send to the external apparatus a fourth data block including a command for the predetermined operation during a predetermined time, said second logical unit sends to the external apparatus the third data block.

* * * * *

UNITED STATES PATENT AND TRADEMARK OFFICE
CERTIFICATE OF CORRECTION

PATENT NO. : 7,167,940 B2 Page 1 of 1
APPLICATION NO. : 10/253510
DATED : January 23, 2007
INVENTOR(S) : Nakamura et al.

It is certified that error appears in the above-identified patent and that said Letters Patent is hereby corrected as shown below:

SHEET 4:
FIG. 5, "TRANSACTIOIN" should read -- TRANSACTION -- (2x's).

SHEET 6:
FIG. 7, "SPRIT_TIMEOUT" should read -- SPLIT_TIMEOUT --; and
FIG. 7, "CLOCK_STOROBE_ARRIVED," should read
-- CLOCK_STROBE_ARRIVED, --.

COLUMN 3:
Line 8, "an" should read -- a --; and
Line 57, "videodisc)" should read -- video disc) --.

COLUMN 15:
Line 55, "H/W." should read -- H/W --.

COLUMN 16:
Line 51, "notifies" should read -- notify --.

COLUMN 24:
Line 24, "coffespond" should read -- correspond --.

Signed and Sealed this

Eighteenth Day of March, 2008

JON W. DUDAS
*Director of the United States Patent and Trademark Office*